(12) United States Patent
Schmitt et al.

(10) Patent No.: US 11,471,942 B2
(45) Date of Patent: Oct. 18, 2022

(54) LEVEL PLATE OF A PRESSING TOOL

(71) Applicant: GKN Sinter Metals Engineering GmbH, Radevormwald (DE)

(72) Inventors: Rainer Schmitt, Wachtberg (DE); Hasim Tekines, Wachtberg (DE); Robert Maassen, Witten (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 276 days.

(21) Appl. No.: 16/626,681

(22) PCT Filed: Jun. 29, 2018

(86) PCT No.: PCT/EP2018/067690
§ 371 (c)(1),
(2) Date: Dec. 26, 2019

(87) PCT Pub. No.: WO2019/002600
PCT Pub. Date: Jan. 3, 2019

(65) Prior Publication Data
US 2020/0222981 A1    Jul. 16, 2020

(30) Foreign Application Priority Data
Jun. 29, 2017   (DE) ..................... 10 2017 114 458.7

(51) Int. Cl.
*B29C 43/00* (2006.01)
*B22F 3/03* (2006.01)
(Continued)

(52) U.S. Cl.
CPC ............... *B22F 3/03* (2013.01); *B30B 11/02* (2013.01); *B22F 2003/033* (2013.01); *B22F 2999/00* (2013.01); *B33Y 80/00* (2014.12)

(58) Field of Classification Search
CPC ..... B30B 15/06; B30B 15/065; B30B 15/067; B30B 11/02; B30B 11/027; B22F 3/03;
(Continued)

(56) References Cited

U.S. PATENT DOCUMENTS 5,498,147 A   3/1996  Katagiri et al.
6,165,400 A  12/2000  Hinzmann
(Continued)

FOREIGN PATENT DOCUMENTS

CN   1371802 A   10/2002
CN   1480278 A    3/2004
(Continued)

OTHER PUBLICATIONS

PCT International Search Report, PCT/EP2018/067690, dated Oct. 5, 2018, 7 pages.
(Continued)

*Primary Examiner* — Joseph S Del Sole
*Assistant Examiner* — Thu-Khanh T. Nguyen
(74) *Attorney, Agent, or Firm* — Quarles & Brady LLP

(57) ABSTRACT

A plane plate for a pressing tool of a press in which the plane plate for activating a punch of the press by way of at least one lifting cylinder is displaceable along an axial direction. The plane plate has a link to the at least one lifting cylinder, a centrally disposed receptacle 9 for contacting the punch or a punch holder of the press and at least one at least partially cylindrical guiding face, which for contacting a first guide column is parallel with the axial direction. The plane plate has, in at least a first cross section which runs through the link and the receptacle parallel with the axial direction and along a radial direction that runs so as to be perpendicular to the axial direction, at least a first region between the link and the receptacle, having a wall thickness, wherein the wall thickness in the first region and so as to be spaced apart from the receptacle as well as from the link has at least a minimum.

15 Claims, 11 Drawing Sheets

Figure 1:
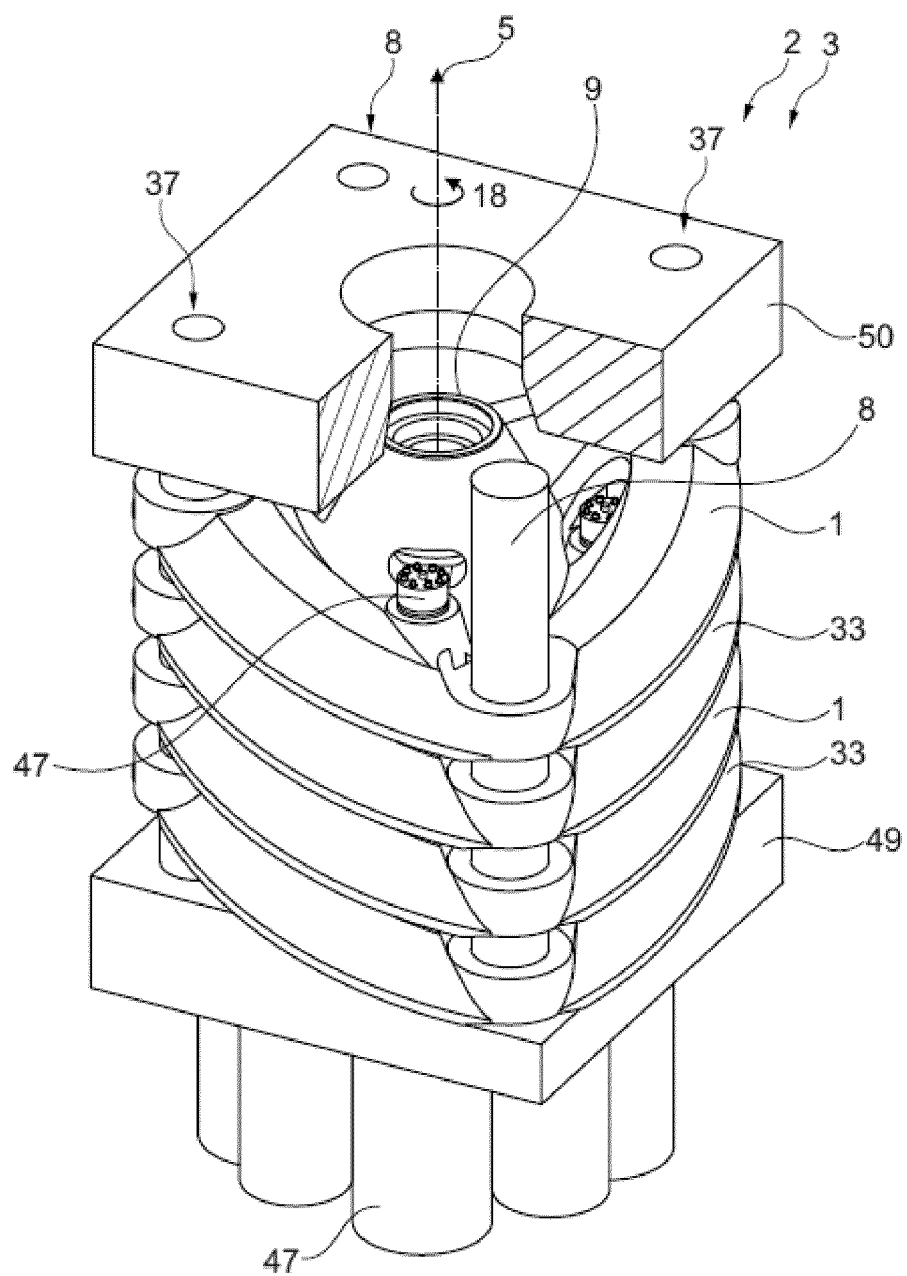

(51) Int. Cl.
*B30B 11/02* (2006.01)
*B33Y 80/00* (2015.01)

(58) Field of Classification Search
CPC ......... B22F 3/033; B29C 43/02; B29C 43/32; B29C 43/3205
See application file for complete search history.

(56) References Cited

U.S. PATENT DOCUMENTS

| | | |
|---|---|---|
| 2014/0010905 A1 | 1/2014 | Solty |
| 2017/0087638 A1 | 3/2017 | Schmitt et al. |
| 2018/0015680 A1 | 1/2018 | Schmitt et al. |
| 2018/0236547 A1 | 8/2018 | Schmitt et al. |

FOREIGN PATENT DOCUMENTS

| | | |
|---|---|---|
| CN | 201423768 Y | 3/2010 |
| CN | 102554225 A | 7/2012 |
| WO | 2016124498 A1 | 8/2016 |
| WO | 2016124511 A1 | 8/2016 |

OTHER PUBLICATIONS

PCT Written Opinion, PCT/EP2018/067690, dated Oct. 5, 2018, 15 pages.
National Intellectual Property Administration, P.R. China, First Office Action and Search Report, Application No. 201880056575.1, dated Jun. 3, 2021, 25 pages.
Japan Patent Office, Notice of Reasons for Refusal, Application No. 2019-572206, dated Aug. 2, 2022, 10 pages.

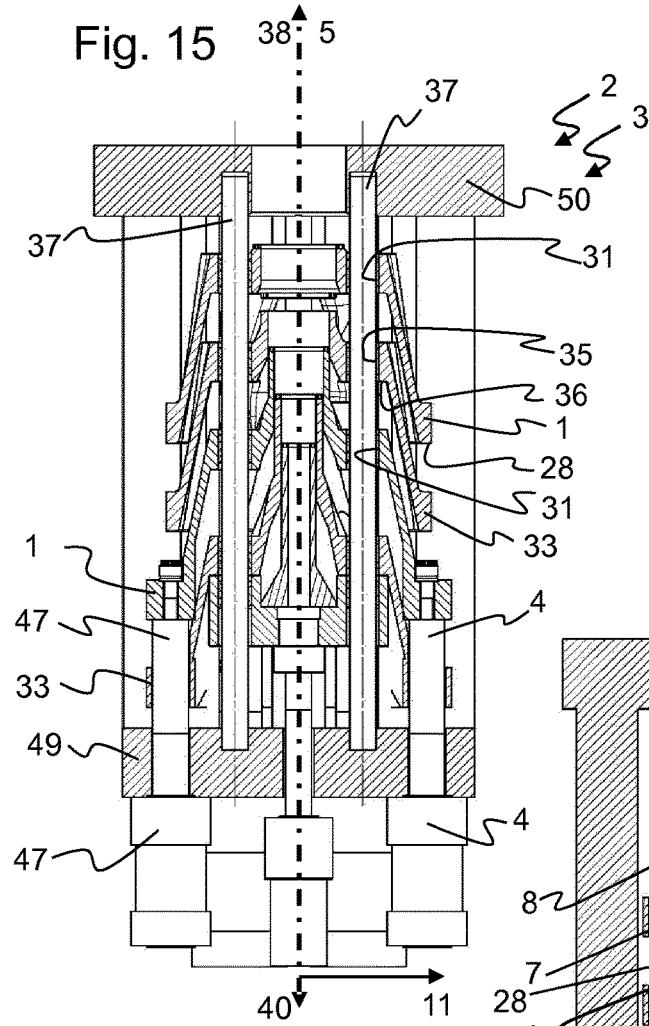
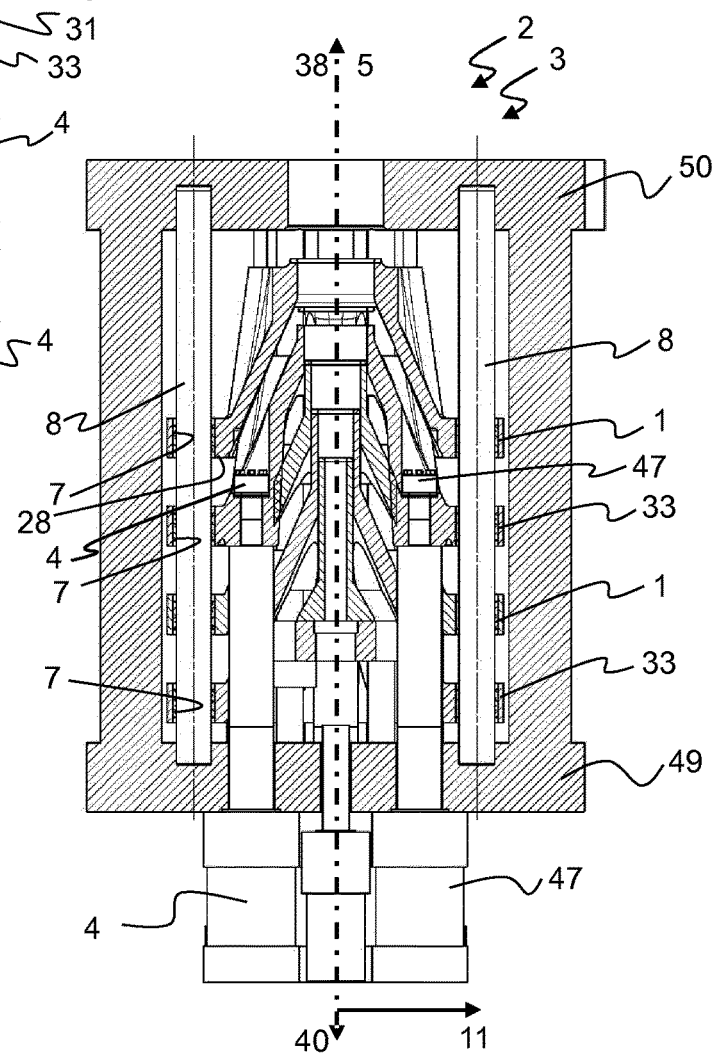

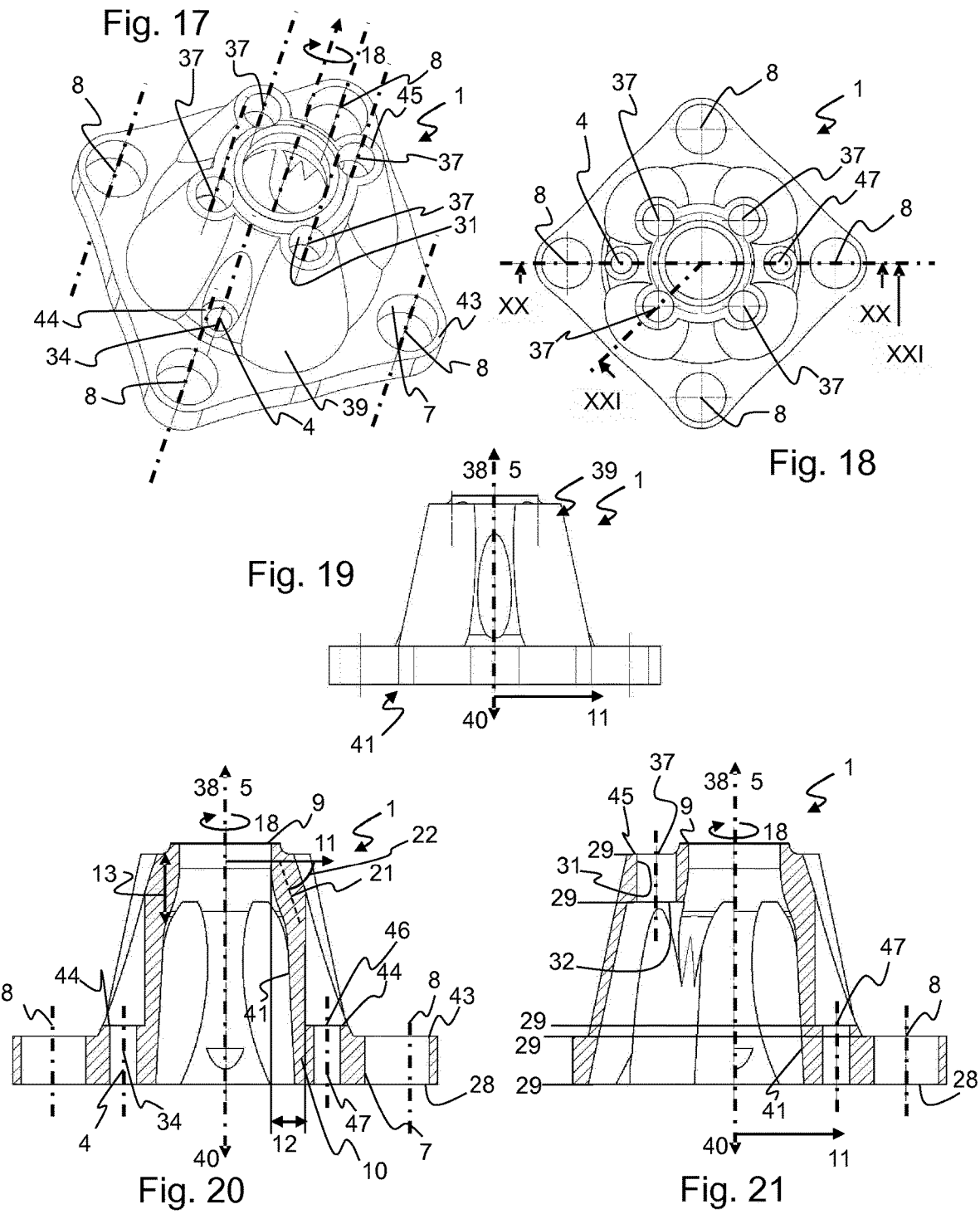

LEVEL PLATE OF A PRESSING TOOL

This application represents the U.S. national stage entry of International Application No. PCT/EP2018/067690 filed Jun. 29, 2018, which claims priority to German Patent Application No. 10 2017 114 458.7 filed Jun. 29, 2017, the disclosure of which is incorporated herein by reference in its entirety and for all purposes.

The invention relates to a plane plate for a pressing tool of a press, in particular a powder press for producing green compacts. The invention furthermore relates to the use of a plane plate in a pressing tool of a press for producing a green compact. Green compacts which are capable of sintering are in particular produced by the press, thus green compacts which can be sintered after the pressing procedure. In particular, metallic and/or ceramic powders can be compressed so as to form green compacts in the press.

Known presses of this type comprise at least a die, an upper pressing tool comprising one or a plurality of upper punches, and a lower pressing tool comprising one or a plurality of lower punches. An internal circumferential face of the die forms the receptacle for the powder, or the green compact to be produced, respectively. At least one upper punch of the upper pressing tool can in particular move into the die along an axial direction by way of a first end side of the die that is open toward the top. The at least one upper punch herein slides along the internal circumferential face of the die and increasingly compresses the powder. At least one lower punch which moves into the die along the axial direction by way of a second end side of the die that is open toward the bottom, or moves between an upper position and a lower position in the die, respectively, can in particular be additionally provided. The powder is thus compressed between the at least one upper punch and the at least one lower punch so as to form a green compact, wherein the internal circumferential face of the die defines in particular a lateral contour of the green compact.

One or each pressing tool comprises in particular a plurality of punches, wherein at least one punch for compressing the powder is displaceable along the axial direction in relation to the at least one further punch. Each punch (and each component of the pressing tool that for transmitting the compression force is connected to said punch) herein can be assigned to a tool plane. A plane plate (also referred to as a tool plane plate) which is activated by at least one lifting cylinder and/or is displaced along the axial direction by the lifting cylinder is typically provided for displacing each (displaceable) punch. The plane plate can be guided by at least one guide column which extends along the axial direction. Twisting of the plane plate in a circumferential direction and/or tilting of the plane plate about an axis running along the radial direction is minimized or prevented, respectively, by way of the at least one guide column. The various plane plates at least of an upper or a lower pressing tool can be collectively guided by guide columns.

A punch holder which transmits a compression force transmitted from the plane plates to the at least one punch can additionally be disposed between the plane plate and the at least one punch which contacts the powder in the die. Furthermore, compression plates which transmit a compression force of the plane plate in the axial direction and in the radial direction toward the punches can be provided between the punch, or the punch holder, respectively, and the plane plate. The punch and punch holder, respectively, can be fastened to the compression plate or to the plane plate by way of clamping plates, or alternatively bayonet closures or bowl-shaped receptacles.

In the case of known pressing tools, or presses, respectively, the individual plane plates which are characterized by being guided by way of at least one guide column and one link to the at least one lifting cylinder, are mutually spaced apart in the axial direction and disposed on top of one another, that is to say that said plane plates are permanently disposed at different heights (levels) along the axial direction. A plane plate herein can be embodied so as to be cubic, cuboid, or disk-shaped. The plane plate extends between a centrally disposed receptacle for the compression plate, the punch holder, or the punch, along the radial direction at least up to a cylindrical guiding face which is provided for contacting one of the guide columns.

A press is known, for example, from U.S. Pat. No. 5,498,147. The plane plates illustrated therein are shaped so as to be rectangular in the cross section and have a consistent wall thickness. The plane plate is perforated in sub-regions such that a ram of the lifting cylinder, or a compression plate for connecting to the punch, respectively, can be received on the plane plate. The cross-sectional variations herein are however not present in the region between the guiding faces on the guide columns and the central receptacle for the compression plate, and are also not present continuously along an extent, but are in each case provided only at one position, specifically at the receptacle for the compression plate, wherein the cross-sectional variations are typically formed by lateral walls that run parallel with the axial direction.

The construction of a known press, or of a pressing tool, respectively, has a large height in the axial direction. The individual components of the respective tool plane (thus the punch, optionally the associated punch holder, optionally the associated compression plate) herein, proceeding from the die for each tool plane, extend dissimilarly far along the axial direction such that dissimilar elasticities are present for each tool plane. The elasticity of the tool plane describes in particular the deformation of the components of the tool plane in the axial direction as a result of a compression force acting by way of the lifting cylinders on the link, or by way of the punch or the punch holder on the receptacle, respectively. The unit of elasticity is: m/N [meter/Newton].

As a result of the dissimilar elasticities, demolding of the green compact to be produced can be specifically problematic on account of the dissimilar expansion of the components between different tool planes in the relaxation of the tool planes (compression force is reduced), wherein formations of cracks can arise in the green compact.

Proceeding therefrom, it is an object of the present invention to at least partially remedy or even solve the problems described with reference to the prior art. In particular, the dissimilarities in the elasticities are to be at least minimized, wherein the pressing tools are moreover capable of being produced, or provided, respectively, with a smaller installation height. The weight of at least the plane plates is furthermore to be ideally reduced. The assembly of the press, or of the plane plates, respectively, can thus be simplified and optionally also be carried out more rapidly. In particular, comparatively compact presses having a smaller installation height can thus also be used, such that material and costs can also be saved here. Furthermore, a deformation of the plane plate during operation of the plane plate is to be at least minimized specifically in the region of the receptacle.

In order for said object to be achieved, plane plates according to the features of claims 1 and 4 and the use of plane plates according to claims 14 and 15 are proposed. Advantageous embodiments are the subject matter of the dependent claims. The features listed individually in the claims can be combined with one another in a technologically expedient manner and can be supplemented by explanatory facts from the description and details from the figures, wherein further embodiment variants of the invention are indicated.

A plane plate for a pressing tool of a press, in particular of a powder press for producing green compacts, contributes to this end. Green compacts which are capable of sintering can in particular be produced by the press, thus green compacts which can be sintered after the pressing procedure. In particular, metallic and/or ceramic powders can be compressed so as to form green compacts in the press.

The plane plate can in particular be embodied so as to be integral.

The plane plate for activating a punch of the press by way of at least one lifting cylinder can be displaced along an axial direction. The plane plate has a link to the at least one lifting cylinder, at least one at least partially cylindrical guiding face which for contacting a guide column is parallel with the axial direction, and a centrally disposed receptacle for contacting the punch or the punch holder of the press. The plane plate has, in at least a first cross section which runs through the link and the receptacle parallel with the axial direction and along a radial direction that runs so as to be perpendicular to the axial direction, at least a first region between the link and the receptacle having a wall thickness, wherein the wall thickness in the first region and so as to be spaced apart from the receptacle as well as from the link has at least a minimum.

According to one further design embodiment, the plane plate has a link to the at least one lifting cylinder, at least one at least partially cylindrical guiding face which for contacting a guide column is parallel with the axial direction, and a centrally disposed receptacle for contacting the punch or the punch holder of the press. The press plate in at least a plurality of first cross sections which, so as to be parallel with the axial direction and along a radial direction that runs so as to be perpendicular to the axial direction and in a circumferential direction run so as to be mutually offset, between the receptacle and a radial position where the link is disposed (for example, in a first cross section that is disposed so as to be offset in the circumferential direction in relation to said first cross section), has at least a first region in which a wall thickness is variable. The plane plate is designed such that a form line of the receptacle in the operation of the plane plate and when transmitting a pressing force is deformable by at most 0.05 millimeters.

The minimum can be configured as an opening which connects to one another an upper side of the plane plate that points in a first axial direction and a lower side of the plane plate that points in a second axial direction counter to the first axial direction.

The wall thickness in the first region, in particular at least between the receptacle and the minimum, can in particular be continuously variable.

The minimum represents a local weakening of the plane plate. The minimum and/or the variable wall thickness serves/serve for transmitting in a targeted and controlled manner the pressing forces that act in the operation of the press. Said pressing forces (proceeding from the punch, or the punch holder, respectively) act on the plane plate at least by way of the receptacle, on the one hand, and (proceeding from the lifting cylinders) act at least by way of the links on the other hand.

By way of the at least one minimum and/or the variable wall thickness, a force transmission, proceeding from the link toward the punch holder, or toward the punch, respectively, that is distributed uniformly across the entire receptacle is in particular guaranteed.

By way of the at least one minimum and/or the variable wall thickness it is in particular ensured that a deformation of the receptacle is minimized in the operation of the press, even when impinging the plane plate with the nominal pressing force, and the deformation herein takes place as uniformly as possible.

The receptacle in the non-stressed state of the plane plate (installed situation of the plane plate in the press, or in the adapter or in the adapter lower part or upper part, respectively; no introduction of a pressing force) has a form line. Said form line has a defined location or position, respectively, in relation to the axial direction and in relation to the radial direction. The form line describes in particular the geometric design of the receptacle. The form line can be described by means of form tolerances such as, for example, the straightness, the planarity, the roundness, the cylindrical shape, or the like. The form line can extend in an encircling manner in the circumferential direction and describes the shape of the receptacle. The form line can in particular be a virtual line which extends, for example, along a bearing face of the receptacle for the punch, or the punch holder, respectively. The form line can also be an internal periphery of the receptacle.

The (nominal) pressing force considered here, at which the form line deformation is to be considered, is in particular between 1000 and 120 000 kN (Kilonewton), preferably between 10 000 and 100 000 kN. The pressing force is to be introduced (uniformly) into the plane plate by way of the provided link(s), and the form line deformation is to be evaluated.

The at least one minimum and/or the variable wall thickness guarantee/guarantees in particular that, when impinging the plane plate with the pressing force, a deviation from the form line in the radial direction at the receptacle is at most 0.05 millimeters, in particular at most 0.02 millimeters.

The portion between the at least one link and the central receptacle in terms of the wall thickness is in particular configured such that when introducing the pressing force by way of the at least one link the form line (present in the absence of the pressing force) of the receptacle is only slightly deformed. The at least one minimum and/or the variable wall thickness guarantee/guarantees in particular that, when impinging the plane plate with the pressing force, a relative deviation from the form line (thus a dissimilar deformation of the receptacle and the form line, respectively) in the axial direction at the receptacle is at most 0.05 millimeters, in particular at most 0.02 millimeters. A repositioning of the receptacle (thus of the form line of the receptacle) along the axial direction herein is in particular permissible. However, dissimilar repositioning, thus a deformation of the form line of the receptacle, is at least largely prevented. This herein is to be understood in particular as meaning that the form line of the receptacle in the absence of the pressing force and in the presence of the pressing force remains (almost) congruent, in particular when viewed from the punch.

A plurality of lifting cylinders can be used for displacing the plane plates, wherein the plane plate in this instance has in each case one link to each lifting cylinder. The at least one lifting cylinder in relation to the plane plate can be disposed such that the plane plate about an axis which is parallel to the radial direction is impinged by as low a torque as possible which could cause tilting of the plane plate about said axis. For example, two lifting cylinders which along the circumferential direction are disposed so as to be mutually offset by 180 angular degrees are thus in particular provided.

The plane plate can have a plurality of (preferably four) at least partially cylindrical guiding faces which are disposed so as to be mutually spaced apart in a direction perpendicular to the axial direction. The plane plate can be guided by the at least one guide column along the axial direction across the at least one guiding face, said guide column extending along the axial direction. Twisting of the plane plate in a circumferential direction and/or tilting of the plane plate about an axis running along the radial direction is minimized, or prevented, respectively, by way of the at least one guide column. The plane plates at least of an upper or lower pressing tool can be guided by common guide columns.

The receptacle for contacting the punch or a punch holder of the press is in particular centrally disposed, that is to say (approximately) in a center of the plane plate when the latter is viewed along the axial direction. A central disposal of the receptacle is in particular present when said receptacle is positioned so as to be central between a plurality of links, or at an equal spacing from a plurality of links, respectively, thus in particular so as to be centric in relation to the force introduction points of the lifting cylinder. The receptacle can be disposed so as to be (centric) between a plurality of lifting cylinders and a plurality of guide columns such that the plane plate upon an impingement of the plane plate with a compression force about an axis parallel with the radial direction is impinged by as low a torque as possible which could cause tilting of the plane plate about said axis.

The receptacle can be embodied so as to be round, preferably circular. The receptacle can have a longitudinal axis which runs parallel with the axial direction and/or is disposed so as to be concentric with the receptacle. The radial direction extends perpendicular to the axial direction and in particular proceeding in each case from the longitudinal axis.

The receptacle can have a receptacle face for contacting and/or supporting the punch, or the punch holder, respectively. The punch, or the punch holder, respectively, can be fastened to the receptacle by way of a clamping plate, screw fitting, a bayonet closure, or similar.

The plane plate in the first region in the first cross section can have a first centerline (of the wall thickness), wherein the first centerline in relation to the radial direction runs at a first angle of at least 10 angular degrees.

The first region in the radial direction extends in particular across a first extent. The first centerline in the first region in relation to the radial direction runs at a first angle of at least 10 angular degrees, in particular at least 20, preferably at least 45. The first centerline runs in particular at a first angle of at most 85 angular degrees, preferably at most 80 angular degrees.

The wall thickness describes the material thickness of the plane plate in a manner parallel to the axial direction. The centerline runs through the geometric centers of area of the sectional faces of the plane plate that lie in the first cross section. The first centerline can be defined by the centers of the wall thickness present at the respective radial position.

Said wall thickness is continuously variable, for example when another wall thickness is in each case present at each mutually neighboring position along the radial direction in the first region. This herein does in particular not refer to any abrupt variation of the wall thickness such as is formed, for example, by a bore or similar.

The variation of the wall thickness can be configured as a continuous reduction and/or a continuous enlargement. It can be provided that a specific wall thickness in the first region is present at fewer than five positions in the radial direction, in particular only at most three, two, or one position. The positions herein are mutually spaced apart by at most 0.5 mm or even 0.1 mm in the radial direction.

Known plane plates have a substantially consistent wall thickness in the axial direction. In a cross section which runs through the receptacle and the link parallel with the axial direction and along a radial direction that runs so as to be perpendicular to the axial direction, the plane plates are embodied so as to be in particular rectangular having a substantially consistent wall thickness, wherein an upper side of the plane plate and a lower side of the plane plate and therefore also a centerline of the wall thickness extend so as to be parallel with the radial direction. The plane plates illustrated in U.S. Pat. No. 5,498,147 are shaped so as to be rectangular in the cross section and have a consistent wall thickness. The plane plate is perforated in sub-regions such that a ram of the lifting cylinder, or a compression plate for connecting to the punch, respectively, can be received on the plane plate. The cross-sectional variations or variations in the wall thickness herein are however not present in the region between the link to the lifting cylinder and the central receptacle for the compression plate, but are in each case provided only at one position, specifically at the receptacle for the compression plate, wherein the cross-sectional variations are typically formed by lateral walls that run so as to be parallel with the axial direction. This known teaching is presently deviated from.

The first region in the radial direction can extend across a first extent which is at least 10%, in particular at least 20%, preferably 30%, of a smallest spacing along the radial direction between the central receptacle and the link in the first cross section. The first extent can be at least 5 millimeters, at least 10 millimeters, or at least 20 millimeters.

The receptacle can comprise a receptacle face or a functional region (hereunder also referred to as parts of the receptacle) on the plane plate where the punch or a punch holder can be disposed. The smallest spacing can be determined between the link and a part of the receptacle that is disposed so as to be closest to the link along the radial direction.

The first region is in particular disposed at a spacing of at least 5% of the smallest spacing from the link and/or from the receptacle. The smallest spacing is determined between the central receptacle and the link in the first cross section along the radial direction.

The extent of the link along the radial direction here is defined by the at least partially cylindrical internal circumferential face of a bore in the plane plate that forms the link. The internal circumferential face extends so as to be parallel with the axial direction.

The plane plate can have an upper side that points in a first axial direction and a lower side that points in a second axial direction counter to the first axial direction, wherein the at least one guiding face on the upper side has an upper end (and on the lower side has a lower end). The link on the upper side has an upper linking face (and on the lower side has a lower linking face). The upper end and the upper linking face (and/or the lower end and the lower linking face) are disposed at dissimilar heights in relation to the axial direction and thus are disposed so as to be mutually spaced apart in the axial direction.

The plane plate can have an upper side that points in a first axial direction, and a lower side that points in a second axial direction that is opposite to the first axial direction, a link to the at least one lifting cylinder, a centrally disposed receptacle for contacting the punch or a punch holder of the press, at least a first at least partially cylindrical guiding face which for contacting a first guide column in parallel with the axial direction, and a second at least partially cylindrical guiding face which for contacting a second guide column is parallel with the axial direction. On the lower side of the plane plate, the first guiding face can have a first lower end and the second guiding face can have a second lower end. The first lower end and the second lower end can be disposed at mutually dissimilar heights in relation to the axial direction, and thus can be disposed so as to be mutually spaced apart in the axial direction.

The plane plate can have four (or more) at least partially cylindrical guiding faces for contacting four guide columns (thus in each case one guide column), wherein each guiding face has a lower end. The lower ends of two guiding faces (or at least two guiding faces) can in each case be disposed at a common height.

In particular, two guiding faces are in each case provided, the lower ends of said guiding faces being disposed at a common height. Each of the two at least partially cylindrical first guiding faces thus configures in particular a first lower end, and each of the two at least partially cylindrical second guiding faces thus configures in particular a second lower end. The first lower end and the second lower end can be disposed at mutually dissimilar heights in relation to the axial direction.

The first lower end and the second lower end can be disposed on the lower side of the plane plate.

The guiding faces can be disposed at dissimilar heights. Tilting of the plane plate about an axis that runs perpendicular to the axial direction can thus be reduced, or completely prevented, respectively, in comparison to a plane plate having guiding faces that are disposed exclusively at a common height.

The two guiding faces having the lower ends disposed at the common height can be disposed so as to be mutually offset by 90 or 180 angular degrees in a circumferential direction.

All lower ends of the guiding faces of the one plane plate can preferably be disposed at mutually dissimilar heights in relation to the axial direction.

The lower ends of a plane plate which are disposed at dissimilar heights in relation to the axial direction are in each case in particular mutually spaced apart by at least 5 millimeters, in particular at least 20 millimeters, preferably at least 100 millimeters, particularly preferably at least 200 mm, along the axial direction.

The first guiding plane on the upper side of the plane plate has in particular a first upper end, wherein the lower end and the first upper end are disposed at mutually dissimilar heights in relation to the axial direction, and thus so as to be mutually spaced apart at a distance in the axial direction. The first lower end and the second lower end are disposed so as to be mutually spaced apart by at least 50% of the distance, preferably by at least 100% of the distance, particularly preferably by at least 150% of the distance, in the axial direction.

The plane plate for contacting in each case one guide column can have at least two at least partially cylindrical guiding faces, wherein a first at least partially cylindrical guiding face has a first lower end and a first upper end, and a second at least partially cylindrical guiding face has a second lower end and a second upper end. The first lower end in relation to the axial direction can be disposed at a different height below the second lower end, and the first upper end in relation to the axial direction can be disposed at a different height below the second upper end.

The upper linking face along the axial direction, between the first upper end and the second upper end, can be disposed at a different height in relation to the axial direction.

The upper linking face along the axial direction, between the first upper end and the second lower end, can preferably be disposed at a different height in relation to the axial direction.

The plane plate for activating the punch of the press by way of at least two lifting cylinders can in particular be displaceable along an axial direction. The plane plate has in particular a first link to a first lifting cylinder and a second link to a second lifting cylinder. The links can be disposed at a common height in relation to the axial direction.

The plane plate for activating the punch of the press by way of at least two lifting cylinders can in particular be displaceable along an axial direction. The plane plate has in particular a first link to a first lifting cylinder and a second link to a second lifting cylinder. The links can be disposed at a common height in relation to the axial direction.

According to one other design embodiment, the links can be disposed at dissimilar heights in relation to the axial direction.

Optionally, a cross section that in the circumferential direction is disposed so as to be rotated by an angular range of 90 or of 180 angular degrees in relation to the first cross section can exclusively be embodied so as to be identical to the first cross section.

The wall thickness at least in the first region can vary by at least 5%, preferably by at least 10%, particularly preferably by at least 20%.

The plane plate can have an upper side pointing in a first axial direction, and a lower side pointing in a second axial direction that is opposite to the first axial direction. The upper side and/or the lower side of the plane plate in the first region of the first cross section can run so as to be parallel with the first centerline and/or at a first angle of at least 10 angular degrees, preferably at least 20 angular degrees, particularly preferably at least 45 angular degrees, and at a first angle of at most 80 angular degrees, in particular at most 85 angular degrees, in relation to the radial direction.

Furthermore proposed is a pressing tool for a press, at least comprising a first plane plate and a second plane plate. At least the first plane plate for activating a punch of the press by way of at least one lifting cylinder is displaceable along an axial direction. At least the first plane plate has a link to the at least one lifting cylinder. Each plane plate for contacting a guide column that is common to the plane plates has in each case at least one at least partially cylindrical guiding face, and for contacting the punch or a punch holder of the press has in each case one centrally disposed receptacle. The plane plates along an axial direction are capable of being disposed on top of one another such that the respective at least one guiding face of each plane plate is disposed so as to be coaxial with the respective other at least one guiding face. At least the first plane plate can be embodied like a plane plate described above. The plane plates are capable of being disposed so as to be at least partially mutually overlapping along the axial direction and along the radial direction. Said plane plates are in particular capable of being mutually disposed such that at least parts of the two plane plates are disposed at an identical height in relation to the axial direction (and thus neighbor one another along the radial direction).

The plane plates can be disposed so as to be nested in one another (and thus not exclusively so as to be mutually spaced apart in the axial direction) such that an installation height of the pressing tool can be reduced. Nested herein means that the plane plates are capable of being disposed on top of one another along the axial direction, and in the radial direction are capable of being disposed so as to have at least parts of the plane plates beside one another.

The plane plates of the pressing tool for contacting two guide columns that are common to the plane plates can have in each case at least two at least partially cylindrical guiding faces. The first plane plate has a first at least partially cylindrical guiding face having a first lower end, and the second plane plate has a third at least partially cylindrical guiding face having a third lower end. The first plane plate in relation to the axial direction is disposed above the second plane plate. The plane plates are mutually disposed such that the first guiding face contacts a first guide column of the common guide columns, and the third guiding face contacts a second (thus another) guide column of the common guide columns. The first lower end in relation to the axial direction is disposed below the third lower end.

As has been explained above in the context of the plane plate, the guiding faces of a plane plate can be disposed at dissimilar heights such that the guiding faces of different plane plates in the axial direction are capable of being disposed on different guide columns in a sequence that is reversed in relation to the plane plates. Tilting of the plane plates about an axis that runs perpendicular in relation to the axial direction can thus be reduced, or completely prevented, respectively, in comparison to a plane plate having guiding faces that are disposed exclusively at a common height, and a nested arrangement of the plane plates can be implemented such that an overall lower installation height of the pressing tools is enabled.

The explanations pertaining to the plane plate apply likewise to the pressing tool and vice versa.

Furthermore proposed is the use of a plane plate, in particular one of the plane plates described above, in a pressing tool, in particular in a pressing tool described above, of a press for producing a green compact. Sintering-capable green compacts, thus green compacts which can be sintered after the pressing procedure can in particular be produced by the press. In particular, metallic and/or ceramic powders can be compressed so as to form green compacts in the press.

The plane plate for activating a punch of the press by way of at least one lifting cylinder is displaceable along an axial direction. The plane plate has a link to the at least one lifting cylinder, at least one at least partially cylindrical guiding face which for contacting a guide column is parallel with the axial direction, and a centrally disposed receptacle for contacting the punch or the punch holder of the press. The plane plate has, in at least a first cross section which runs through the link and the receptacle parallel with the axial direction and along a radial direction that runs so as to be perpendicular to the axial direction, at least a first region between the link and the receptacle having a wall thickness, wherein the wall thickness in the first region and so as to be spaced apart from the receptacle as well as from the link has at least a minimum.

According to one further design embodiment, the plane plate for activating a punch of the press by way of at least one lifting cylinder is displaceable along an axial direction. The plane plate has a link to the at least one lifting cylinder, at least one at least partially cylindrical guiding face which for contacting a guide column is parallel with the axial direction, and a centrally disposed receptacle for contacting the punch or the punch holder of the press. The press plate in at least a plurality of first cross sections which, so as to be parallel with the axial direction and along a radial direction that runs so as to be perpendicular to the axial direction and in a circumferential direction run so as to be mutually offset, between the receptacle and a radial position where the link is disposed (for example, in a first cross section that is disposed so as to be offset in the circumferential direction in relation to said first cross section), has at least a first region in which a wall thickness is variable. The plane plate herein is designed such that a form line of the receptacle in the operation of the plane plate and when transmitting a pressing force is deformed by at most 0.05 millimeters.

The explanations pertaining to the plane plates and/or the pressing tool likewise apply to the proposed use and vice versa.

A method for activating a press is in particular implementable by way of the plane plate and/or the pressing tool, wherein the press comprises at least one guide column and at least one lifting cylinder as well as a pressing tool (described above). The method comprises at least the following steps:

providing the press and the pressing tool;

disposing the first plane plate and the second plane plate in the press; wherein the plane plates along an axial direction are disposed on top of one another such that the respective at least one at least partially cylindrical guiding face of each plane plate is disposed so as to be coaxial with the respective other at least one guiding face;

wherein the plane plates are disposed so as to be mutually overlapping along the axial direction such that at least parts of the two plane plates are disposed at an identical height in relation to the axial direction (and thus so as to neighbor one another along the radial direction).

The design of the plane plate can be generated using the known production methods such as turning, milling, sawing, boring, as well as grinding, wire cutting, vertical eroding and hard milling, etc. The plane plate can be produced by so-called additive methods, for example laser sintering (3D printing method for producing three-dimensional structures by sintering a pulverulent initial material; workpiece is generated layer-by-layer). On account thereof, a free design of the plane plate is possible, wherein the weight of the plane plate can be reduced and a stiffness, or an elasticity, respectively, of the plane plate can be set in a targeted manner.

The stiffness of the plane plate refers in particular to the resistance of the plane plate in relation to any deformation in the axial direction counter to a compression force that acts by way of the lifting cylinder on the link, or by way of the punch or the punch holder on the receptacle, respectively. The unit of stiffness is: N/m [Newton/meter].

The stiffness can be determined as follows, for example: by way of a FEM analysis in which the deformation, in particular the elastic deformation, of the plane plate at a specific compression force [N] which acts on the plane plate in particular in the axial direction is determined (thus the displacement of the material of the plane plate in the direction of the axial direction, said displacement being indicated in [m]). The ratio of said variables (compression force [N]/material displacement [m]) represents the stiffness of the plane plate.

The lower the stiffness of the plane plate, the higher the elastic deformation (elasticity) of the plane plate. Dissimilar stiffnesses of the different plane plates in the production of green compacts (specifically when demolding, or during the relaxation of the compression force, respectively) can lead to the formation of cracks and thus to a destruction of the green compact.

The elasticity, or the stiffness, respectively, of at least two plane plates, in particular of all plane plates (as described above), preferably varies by at most 20%, or at most 10%.

It is to be noted that the numerals ("first", "second" . . . ) used herein primarily serve (only) for differentiating a plurality of items or variables of the same type, thus in particular do not indicate any interdependence and/or sequence of said items or variables. Should an interdependence and/or sequence be required, this is explicitly stated here, or this is derived in a manner obvious to the person skilled in the art when studying the specifically described design embodiment.

Figure 2:
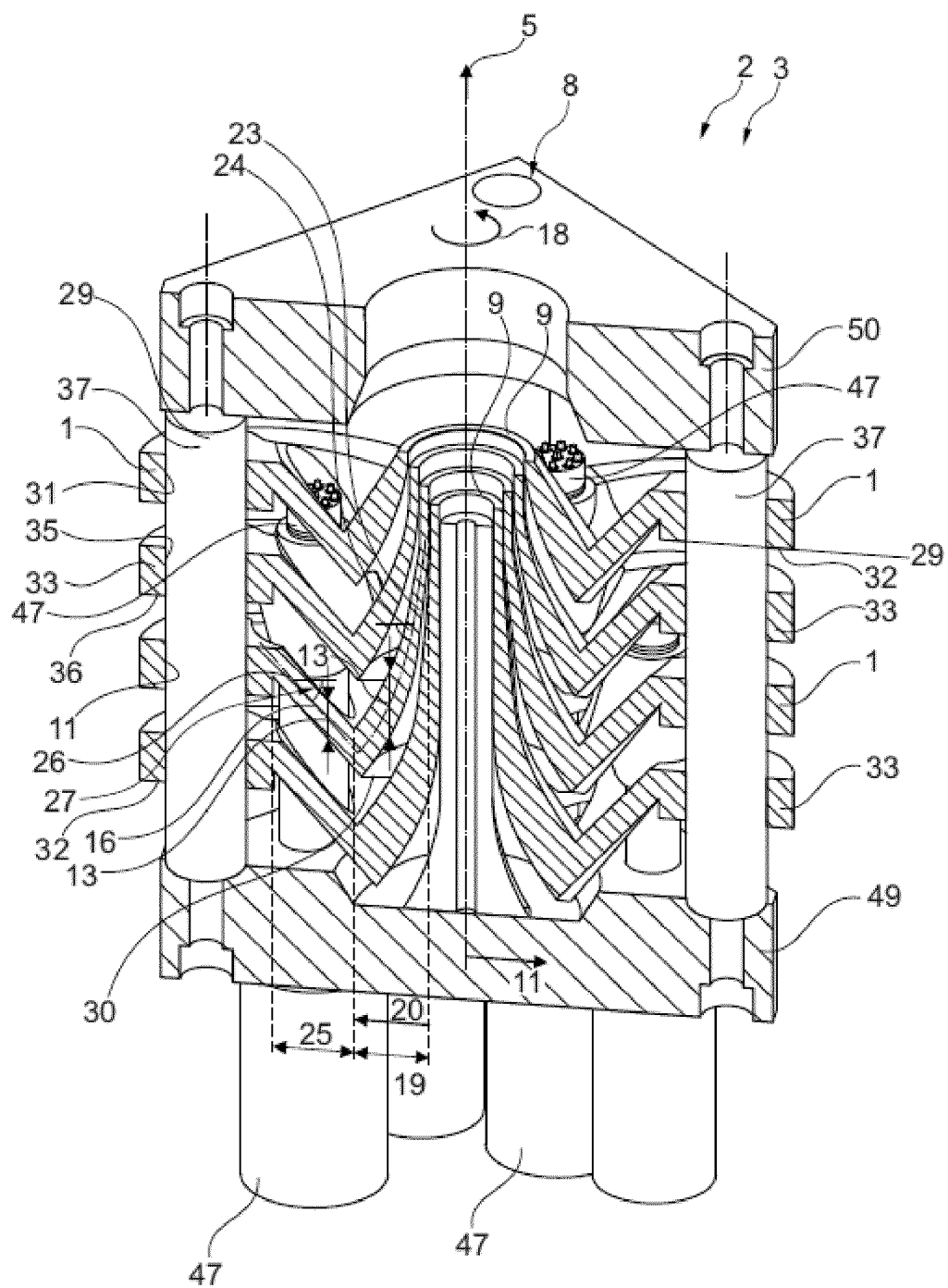
Figure 3:
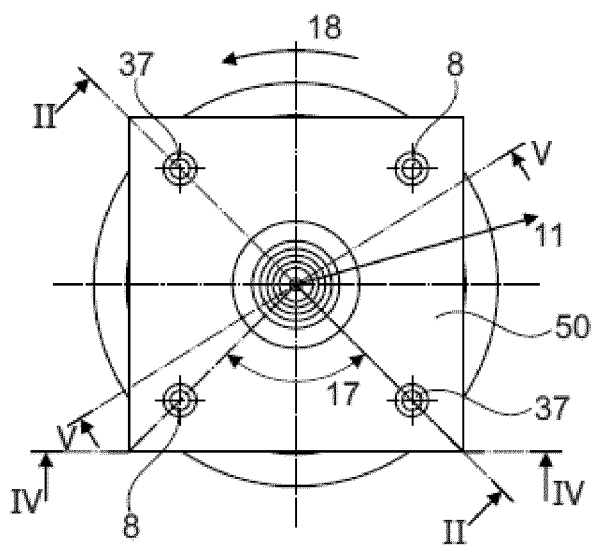
Figure 4:
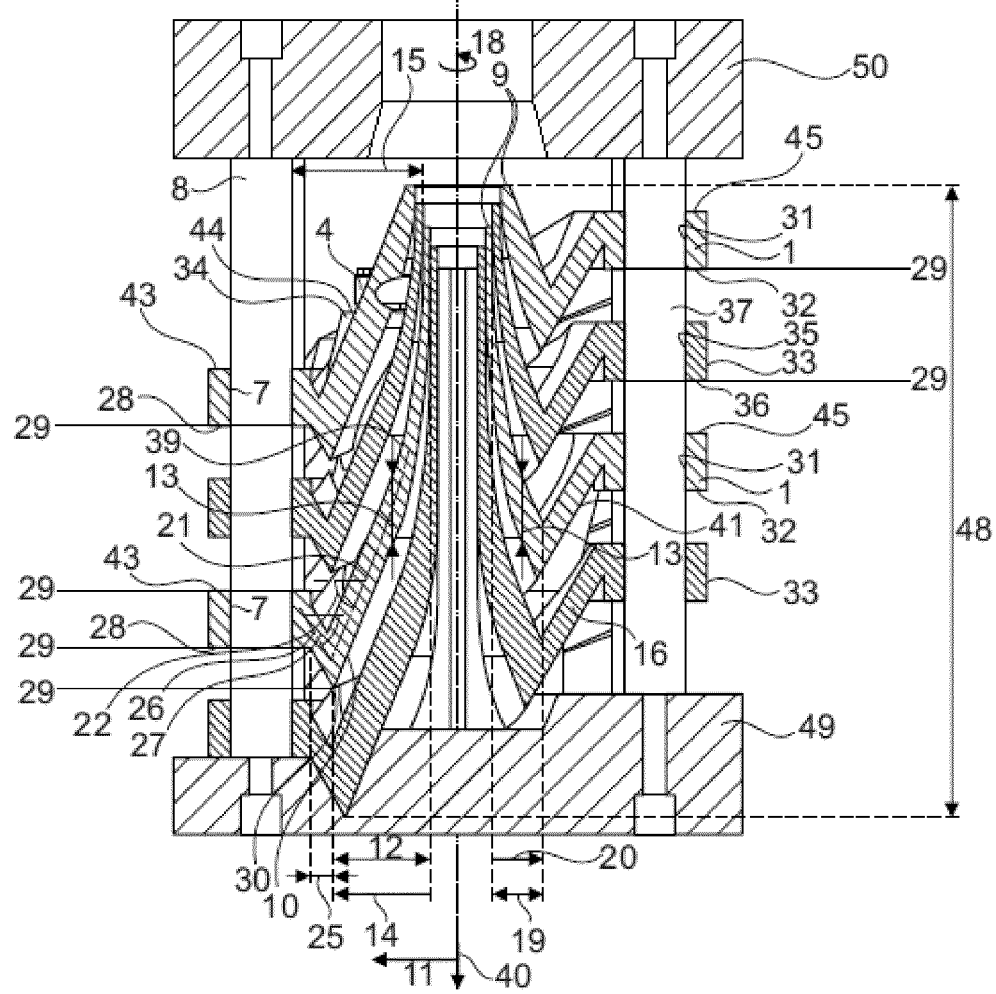
Figure 5:
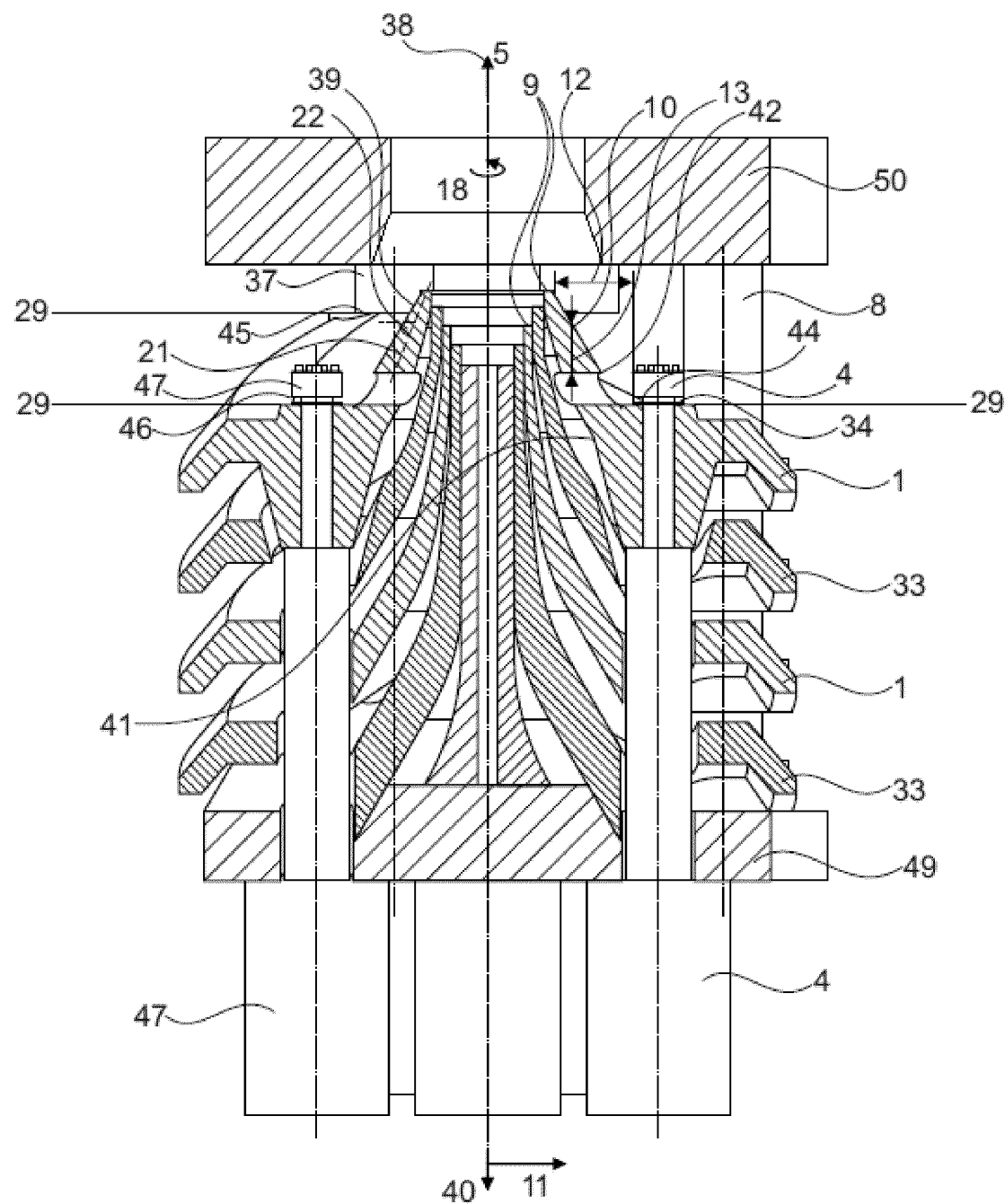
Figure 6:
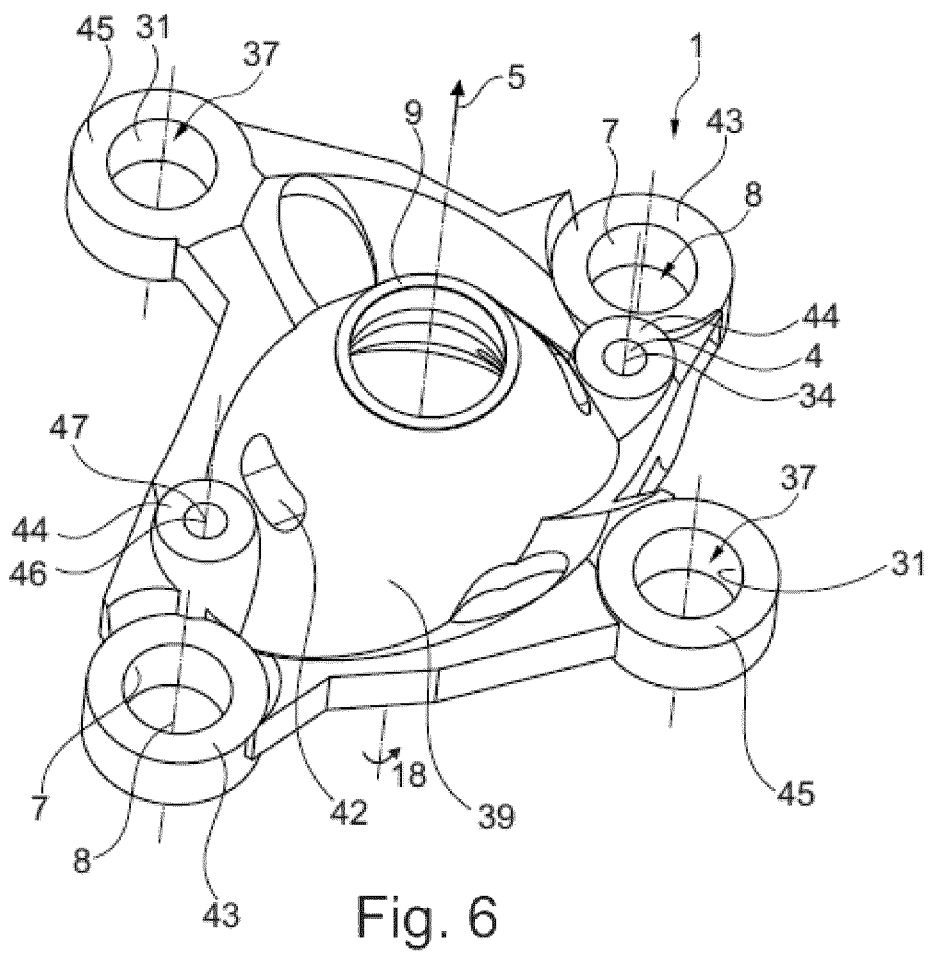
Figure 7:
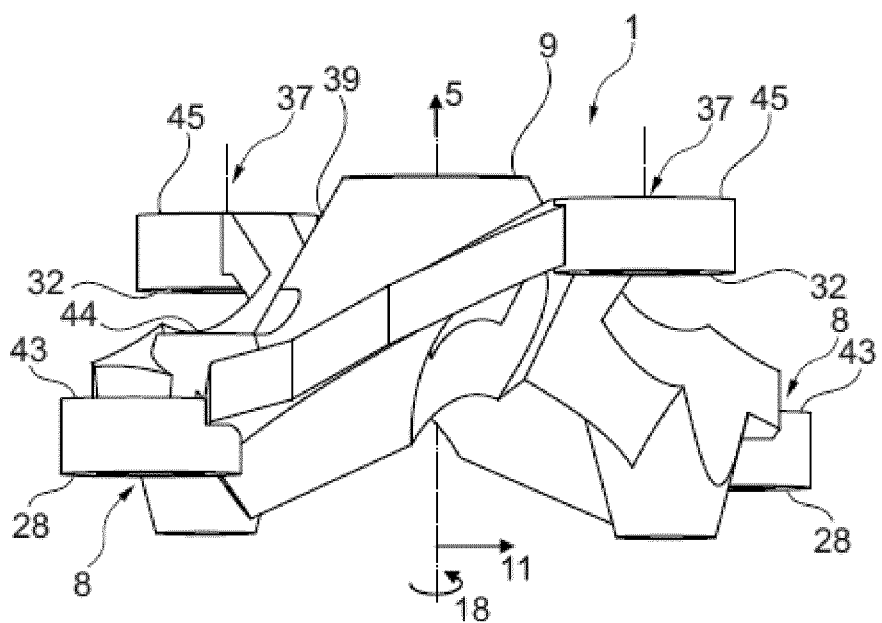
Figure 8:
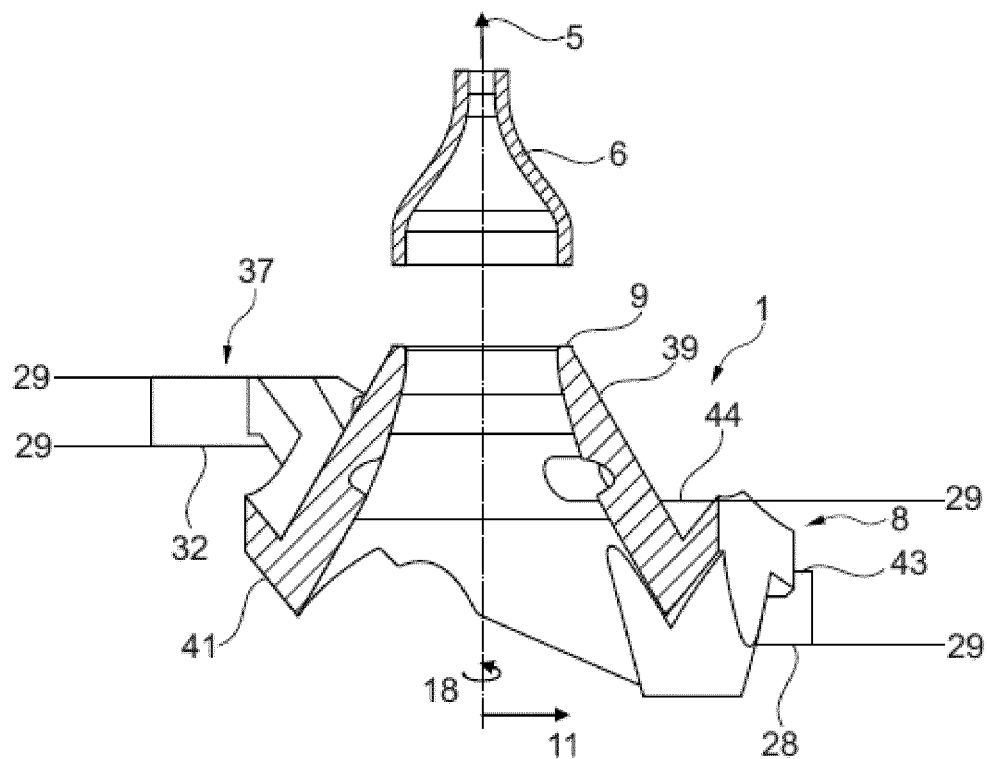
Figure 9:
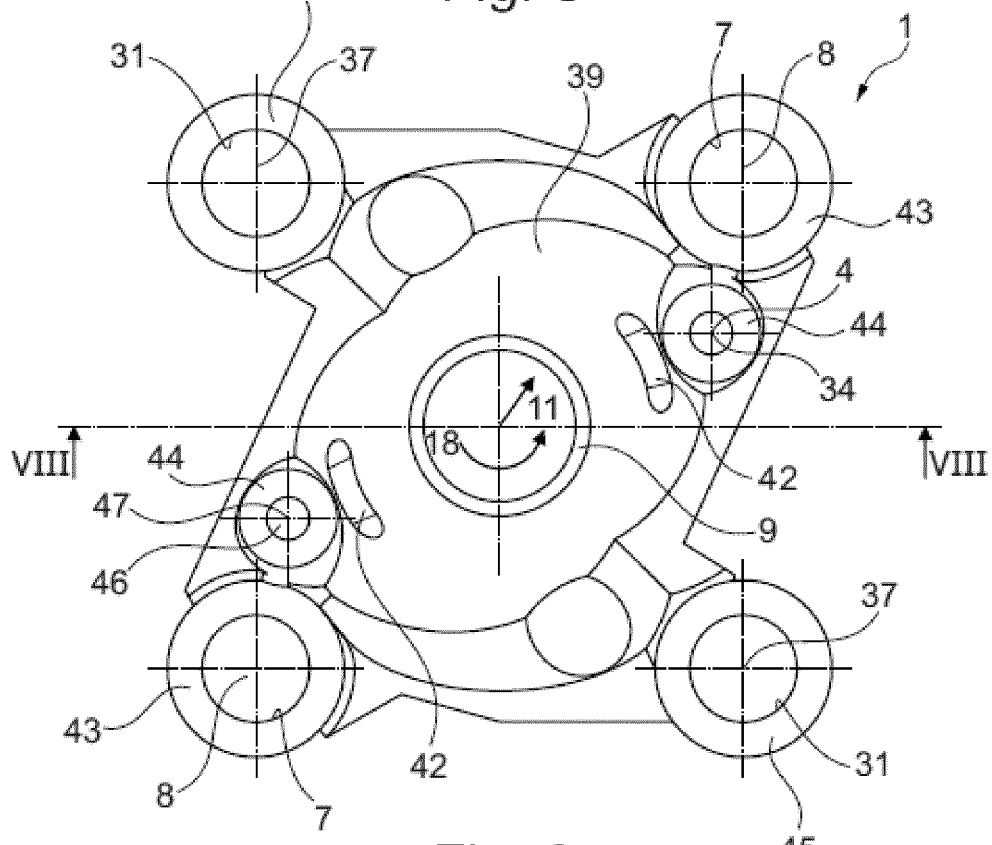
Figure 10:
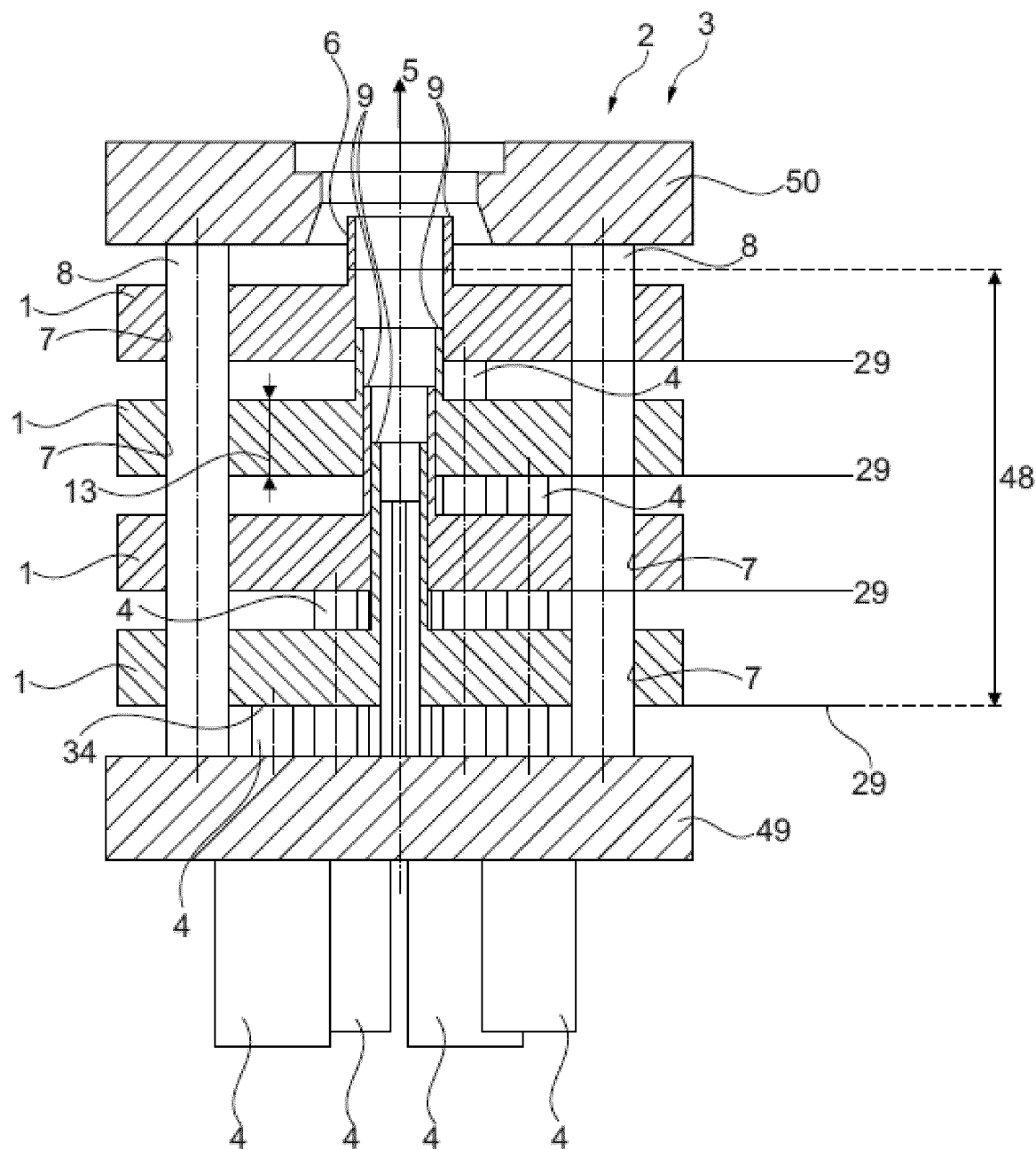
Figure 12:
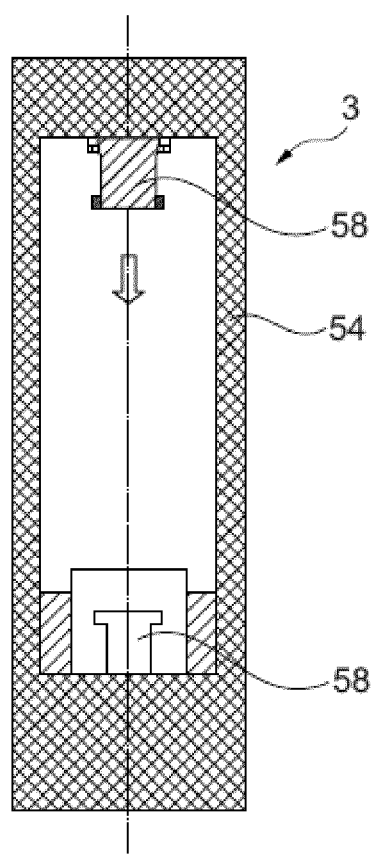
Figure 11:
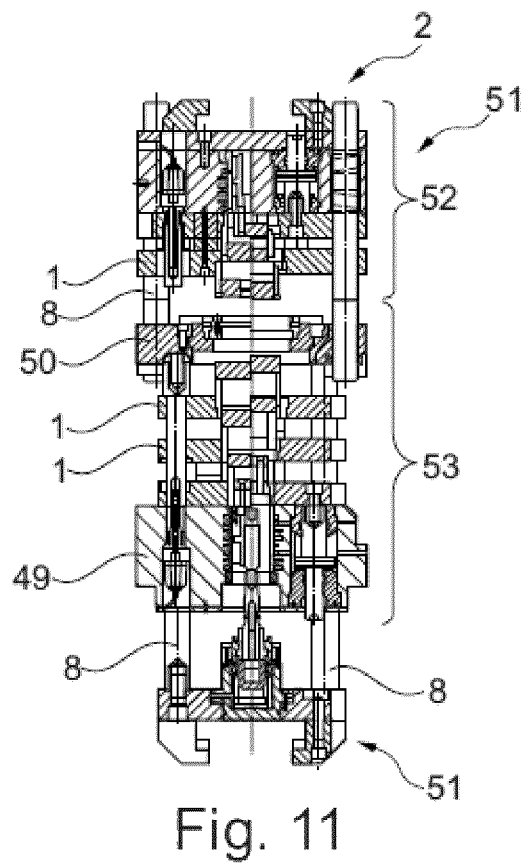
Figure 13:
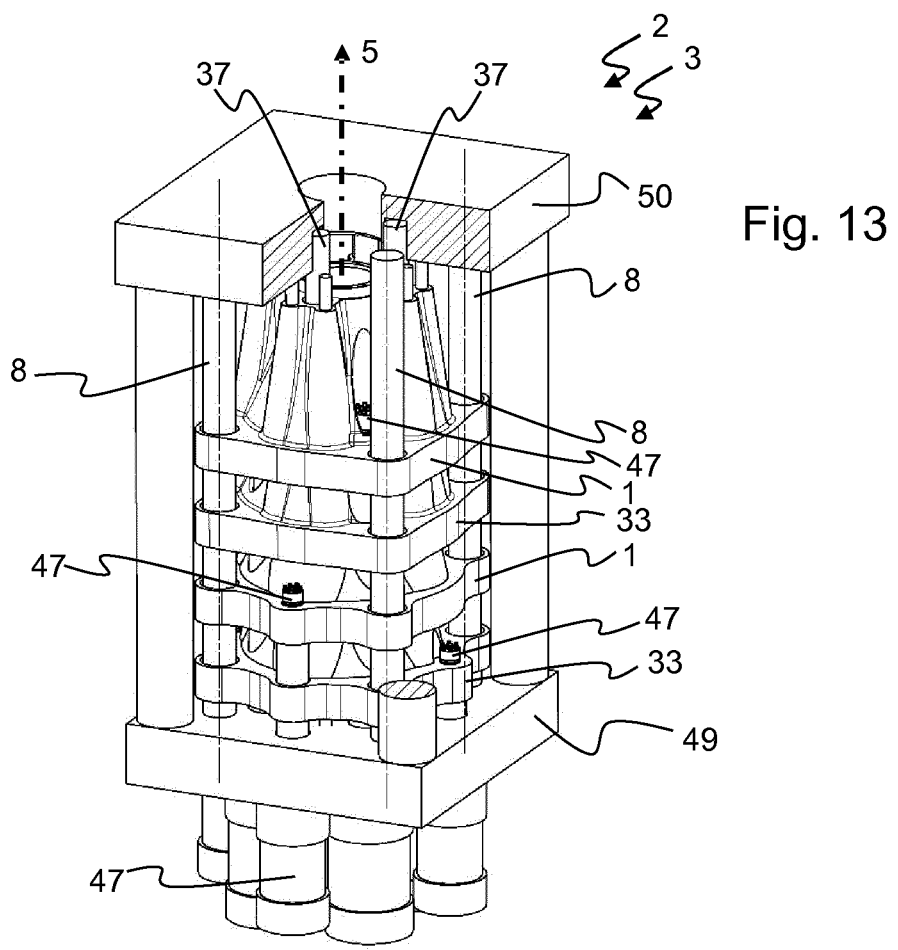
Figure 14:
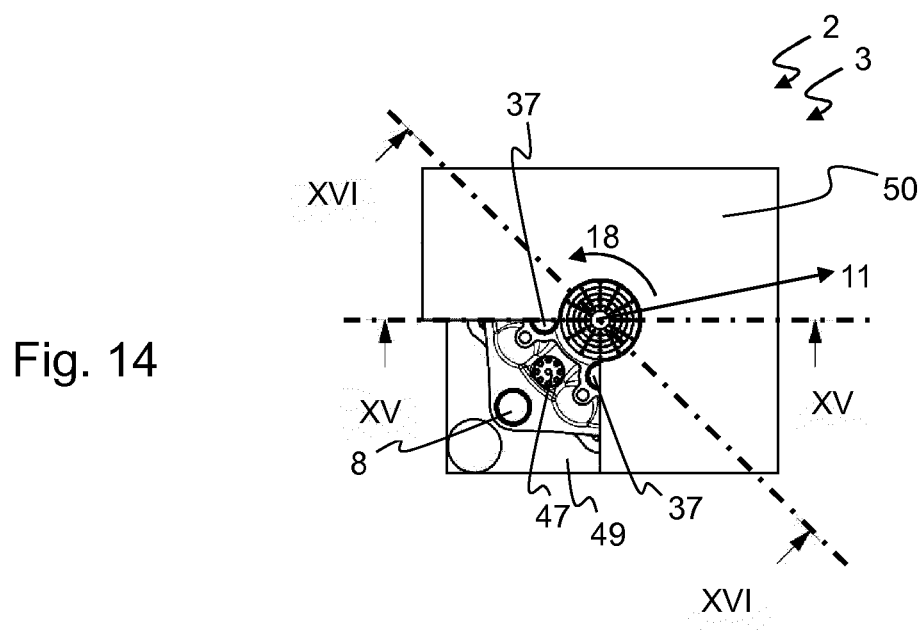

The invention and the technical context will be explained in greater detail hereinbelow with reference to the figures. It should be pointed out that the invention is not to be limited by the exemplary embodiments shown. In particular, it is also possible, unless explicitly indicated otherwise, to extract partial aspects of the facts explained in the figures and combine them with other constituent parts and findings from the present description and/or figures. It is pointed out in particular that the figures, and in particular the size ratios illustrated, are only schematic. The same reference numerals denote the same objects, so that explanations from other figures can additionally be used where appropriate. In the figures:

FIG. 1: shows a pressing tool of a press in a perspective, partially sectional, view;

FIG. 2: shows the pressing tool as per FIG. 1 in a perspective sectional view;

FIG. 3: shows the pressing tool as per FIGS. 1 and 2 in a view from above along the axial direction;

FIG. 4: shows a lateral view of the pressing tool in the section IV-IV according to FIG. 3;

FIG. 5: shows the pressing tool as per FIGS. 1 to 4 in a lateral view in a further section V-V according to FIG. 3;

FIG. 6: shows a plane plate of the pressing tool as per FIGS. 1 to 5 in a perspective view;

FIG. 7: shows the plane plate as per FIG. 6 in a further perspective view;

FIG. 8: shows the plane plate as per FIGS. 6 and 7 in a lateral view in the section VIII-VIII according to FIG. 9;

FIG. 9: shows the plane plate as per FIGS. 6 to 8 in a view from above along the axial direction;

FIG. 10: shows a known pressing tool in a lateral sectional view;

FIG. 11: shows a known adapter for a press in a lateral sectional view;

FIG. 12: shows a known press frame for an adapter;

FIG. 13: shows a further exemplary embodiment of a pressing tool of a press in a perspective, partially sectional, view;

FIG. 14: shows the pressing tool as per FIG. 13 in a view from above along the axial direction;

FIG. 15: shows a lateral view of the pressing tool as per FIGS. 13 and 14 in a section XV-XV according to FIG. 14;

FIG. 16: shows the pressing tool as per FIGS. 13 to 15 in a lateral view in a further section XVI-XVI according to FIG. 14;

FIG. 17: shows a plane plate of the pressing tool as per FIGS. 13 to 16 in a perspective view;

FIG. 18: shows the plane plate as per FIG. 17 in a view from above along the axial direction;

FIG. 19: shows the plane plate as per FIGS. 17 and 18 in a lateral view;

FIG. 20: shows the plane plate as per FIGS. 17 to 19 in a lateral view in the section XX-XX according to FIG. 18; and FIG. 21: shows the plane plate as per FIGS. 17 to 20 in a lateral view in the section XXI-XXI according to FIG. 18.

FIG. 1 shows a pressing tool 2 of a press 3 in a perspective, partially sectional, view. FIG. 2 shows the pressing tool 2 as per FIG. 1 in a perspective view, in the section II-II according to FIG. 3. FIG. 3 shows the pressing tool 2 as per FIGS. 1 and 2 in a view from above along the axial direction 5. The profiles of the section lines II-II, IV-IV, and V-V are illustrated in FIG. 3. FIG. 4 shows a lateral view of the pressing tool in the section IV-IV according to FIG. 3. FIG. 5 shows the pressing tool 2 as per FIGS. 1 to 4 in a lateral view in a further section V-V according to FIG. 3. FIGS. 1 to 5 will be collectively described hereunder.

The pressing tool 2 comprises a plurality of plane plates 1, 33, two first plane plates 1 and two second plane plates 33, thus four plane plates 1, 33 which are disposed on top of one another along the axial direction 5. Each of the four plane plates 1, 33 is repositioned along the axial direction 5 by two lifting cylinders, a first lifting cylinder 4 and a second lifting cylinder 47, as is illustrated in FIG. 9. Each plane plate 1, 33 thus has two links, a first link 34 to the first lifting cylinder 4, and a second link 46 to the second lifting cylinder 47. Furthermore provided are four guide columns, two first guide columns 8 and two second guide columns 37, wherein each plane plate 1, 33 for contacting the guide columns 8, 37 that are common to the plane plates 1, 33 has in each case four cylindrical guiding faces, specifically first guiding faces 7 on the first guide column 8 and second guiding faces 31 on the second guide column 37 (wherein the second plane plate 33 has at least one third guiding face 35 on the second guide column 37). Furthermore, each plane plate 1, 33 has in each case one centrally disposed receptacle 9 for contacting the punch 6 (see FIG. 8) or a punch holder (here likewise symbolized by the punch 6) of the press 3. The plane plates 1, 33 are disposed on top of one another along an axial direction 5 such that the guiding faces 7, 31, 35 of each plane plate 1, 33 are in each case disposed so as to be coaxial with the corresponding guiding faces 7, 31, 35 of the other plane plates 1, 33. The plane plates 1, 33 are capable of being at least partially mutually overlapping along the axial direction 5 and along the radial direction 11 such that at least parts of the various plane plates 1, 33 are disposed at an identical height 29 in relation to the axial direction 5 (and thus so as to neighbor one another along the radial direction 11). The plane plates 1, 33 can be disposed so as to be nested in one another (and thus not exclusively so as to be mutually spaced apart in the axial direction 5) such that an installation height 48 of the pressing tool 2 can be reduced. Nested herein means that the plane plates 1, 33 are capable of being disposed on top of one another along the axial direction 5, and in the radial direction 11 are capable of being disposed so as to have at least parts of the different plane plates 1, 33 beside one another.

The pressing tool 2 here furthermore comprises a base plate 49 and a die receptacle plate 50, the guide columns 8, 37 extending therebetween and the plane plates 1, 33 being disposed therebetween.

The plane plates 1, 33 of the pressing tool 2 for contacting four guide columns 8, 37 that are common to the plane plates 1, 33 have in each case four cylindrical guiding faces 7, 31, 35. A first plane plate 1 has a first guiding face 7 having a first lower end 28, and the second plane plate 33 has a third guiding face 35 having a third lower end 36. The first plane plate 1 in relation to the axial direction 5 is capable of being disposed above the second plane plate 33, and the plane plates 1, 33 herein are capable of being mutually disposed such that the first guiding face 7 contacts a first guide column 8 of the common guide columns 8, 37, and the third guiding face 35 contacts a second (thus another) second guide column 37 of the common guide columns 8, 37. The first lower end 28 in relation to the axial direction 5 herein is disposed below the third lower end 36 (see FIG. 4 having the section profile IV-IV illustrated in FIG. 3).

As has been explained above in the context of the plane plate 1, 33, the guiding faces 7, 31, 35 of a plane plate 1, 33 are be disposed at dissimilar heights 29 such that the guiding faces 7, 31, 35 of different plane plates 1, 33 in the axial direction 5 are capable of being disposed on different guide columns 8, 37 in a sequence that is reversed in relation to the plane plates 1, 33. Tilting of the plane plate 1, 33 about an axis that runs so as to be perpendicular to the axial direction 5 can thus be reduced, or completely prevented, respectively, in comparison to a plane plate 1, 33 having guiding faces 7, 31, 35 that are exclusively disposed at a common height 29, and a nested arrangement of the plane plates 1, 33 can be implemented such that an overall lower installation height 48 of the pressing tool 2 is enabled.

A method for activating a press 3 can be implemented by way of the plane plate 1, 33 and the pressing tool 2, wherein the press 3 comprises at least one guide column 8, 37 and at least one lifting cylinder 4, 47, as well as a pressing tool 2 described above. According to step a) of the method, the press 3 and the pressing tool 2 are provided. According to step b) of the method, at least the first plane plate 1 and the second plane plate 33 are disposed in the press 3 (thus between the base plate 49 and the die receptacle plate 50). The plane plates 1, 33 along an axial direction 5 herein are disposed on top of one another such that the respective at least one cylindrical guiding face 7, 31, 35 of each plane plate 1, 33 is disposed so as to be coaxial with the respective other at least one guiding face 7, 31, 35. The plane plates 1, 33 are disposed so as to be at least partially mutually overlapping along the axial direction 5 and along the radial direction 11 such that at least parts of the two plane plates 1, 33 are disposed at an identical height 29 in relation to the axial direction 5 (and thus so as to neighbor one another along the radial direction 11).

As can be seen, the plane plates 1, 33 are embodied so as to be integral.

Reference hereunder will be made to the respective plane plate that is the second from the bottom of the illustrated plane plates of FIGS. 1 to 5. The plane plate 1 for activating a punch 6 of the press 3 by way of at least one lifting cylinder 4, 47 is repositionable along an axial direction 5. The plane plate 1 has a link 34, 46 to the at least one lifting cylinder 4, 47, at least one cylindrical guiding face 7, 31 which for contacting a guide column 8, 37 is parallel with the axial direction 5, and a centrally disposed receptacle 9 for contacting the punch 6 or a punch holder of the press 3. The plane plate 1 in at least a first cross section 10 which between the receptacle 9 and the guiding face 7 runs parallel with the axial direction 5 and along a radial direction 11 that runs so as to be perpendicular to the axial direction 5 has at least a first region 12 in which a wall thickness 13 of the plane plate 1 is continuously variable.

The illustrated plane plate 1 is activated by way of two lifting cylinders 4, 47, wherein the plane plate 1 has in each case one link 34, 46 to each lifting cylinder 4, 47. The lifting cylinder 4, 47, or the lifting cylinders 4, 47, respectively, in relation to the plane plate 1 is/are in particular disposed such that the plane plate 1 is impinged by as low a torque as possible about an axis that is parallel with the radial direction 11.

The plane plate 1 has four guiding faces 7, 31 which are disposed so as to be mutually spaced apart in a direction that is perpendicular to the axial direction 5. The plane plate 1 by way of the at least one guiding face 7, 31 can be guided along the axial direction 5 through the at least one guide column 8, 37 which extends along the axial direction 5. Twisting of the plane plate 1 in a circumferential direction 18 and/or tilting of the plane plate 1 about a rotation axis/direction that runs along a radial direction 11 is minimized or prevented, respectively, by way of the at least one guide column 8, 37. The various plane plates 1, 33 of an upper or a lower pressing tool 2 (only lower pressing tools 2 are illustrated here) are guided by common guide columns 8, 37.

The receptacle 9 for contacting the punch 6 or a punch holder of the press 3 is centrally disposed, that is to say in a center of the plane plate 1, when the latter is viewed along the axial direction 5 (see FIG. 3). The receptacle 9 is disposed between a plurality of lifting cylinders 4, 47 and a plurality of guide columns 8, 37 such that the plane plate 1 in an impingement of the plane plate 1 with a compression force is impinged by as low a torque as possible about an axis that is parallel with the radial direction 11.

The receptacle 9 here is embodied so as to be circular and has a longitudinal axis which runs parallel with the axial direction 5 and is disposed so as to be concentric with the receptacle 9. The radial direction 11 extends so as to be perpendicular to the axial direction 5 and proceeding in each case from the longitudinal axis.

The receptacle 9 has a receptacle face for contacting and supporting the punch 6, or the punch holder, respectively. The punch 6, or the punch holder, respectively, can be fastened to the receptacle 9 by way of a clamping plate, a screw fitting, a bayonet closure, or similar.

The plane plate in at least a first cross section 10 which between the receptacle 9 and the first guiding face 7 runs parallel with the axial direction 5 and along a radial direction 11 that runs so as to be perpendicular to the axial direction 5 has at least a first region 12 in which a wall thickness 13 of the plane plate 1 is continuously variable. The wall thickness 13 herein is determined in a direction that is parallel with the axial direction 5.

Said wall thickness 13 is continuously variable, that is to say the first region 12 at each mutually neighboring position along the radial direction 11 has a respective other wall thickness 13.

The first region 12 in the radial direction 11 extends across a first extent 14 which is at least 10% of a smallest spacing 15 between the receptacle 9 and the first guiding face 7 in the first cross section 10 along the radial direction 11.

The receptacle 9 on the plane plate 1 comprises a receptacle face or a functional region (hereunder also referred to as parts of the receptacle 9) on which the punch 6 or a punch holder can be disposed. The smallest spacing 15 is determined between the first guiding face 7 and a part of the receptacle 9 that along the radial direction 11 is disposed so as to be closest to the guiding face 7.

The plane plate 1 in at least a second cross section 16 (see FIGS. 2 and 4) which runs along the radial direction 11 between the receptacle 9 and the second guiding face 31 and in relation to the first cross section 10 in a circumferential direction 18 is disposed so as to be rotated by an angular range 17 of presently 90 angular degrees (see FIG. 3), has at least a second region 19 in which the wall thickness 13 of the plane plate 1 is continuously variable. The second region 19 herein in the radial direction 11 extends across a second extent 20 which (in terms of numerical value) differs from the first extent 14.

The second region 19 has a wall thickness 13 and a second centerline 23, wherein the second region 19 in the radial direction 11 extends across a second extent 20 in which the second centerline 23 runs at a second angle 24 in relation to the radial direction 11, wherein the second extent 20 differs from the first extent 14.

It can be seen from FIGS. 4 and 5 that a cross section that in relation to the first cross section 10 is rotated by an angular range 17 of 180 angular degrees in the circumferential direction 18 is exclusively embodied so as to be identical to the first cross section 10.

The second cross section 16 also runs so as to be parallel with the axial direction 5 and along a radial direction 11 that runs so as to be perpendicular to the axial direction 5, thus so as to be rotated in relation to the first cross section 10 only in one circumferential direction 18.

It can be seen that the wall thickness 13 varies in the first region 12 and in the second region 19.

The first region 12 in the first cross section 10 has a first centerline 21, wherein the first centerline 21 runs at a first angle 22 in relation to the radial direction 11. The first centerline 21 (and also the second centerline 23) is formed by the centers of the wall thickness 13 present at the respective radial position.

The plane plate 1 in the first cross section 10 (and in the second cross section 16) has a third region 25 which in the radial direction 11 is contiguous to the first region 12 (or to the second region 19, respectively) wherein the third region 25 has a third centerline 26, wherein the third centerline 26 runs at a third angle 27 in relation to the radial direction 11, wherein the first angle 22 (or the second angle 24, respectively) and the third angle 27 are oriented so as to be mutually opposite in relation to the radial direction 11.

The plane plate 1 has an upper side 39 pointing in a first axial direction 38, and a lower side 41 pointing in a second axial direction 40 that is opposite to the first axial direction 38. The upper side 39 and the lower side 41 of plane plate 1 in the first region 12 of the first cross section 10 run at a first angle 22 in relation to the radial direction 11, and in the third region 25 run at third angle 27 in relation to the radial direction 11.

The first cross section 10 extends through the first guiding face 7, and the first guiding face 7 has a first lower end 28 (on the lower side 41 of the plane plate 1) which is disposed at a height 29 in relation to the axial direction 5. A reversing region 30 of the plane plate 1 is disposed in the first cross section 10 (and in the second cross section 16) between the first region 12 (or the second region 19, respectively) and the third region 25. The reversing region 30 disposed in the first cross section 10 between the first region 12 and the third region 25 in relation to the axial direction 5 is disposed below the first lower end 28.

The plane plate 1 for contacting in each case one guide column 8, 37 furthermore has at least two cylindrical guiding faces 7, 31, wherein a cylindrical first guiding face 7 has a first lower end 28 and a cylindrical second guiding face 31 has a second lower end 32, wherein the first lower end 28 and the second lower end 32 are disposed at mutually dissimilar heights 29 in relation to the axial direction 5.

The lower ends, i.e. the first lower end 28 and the second lower end 32, are disposed on the lower side 41 of the plane plate 1. The lower ends 28, 32 of in each case two cylindrical guiding faces 7, 31 of a plane plate 1 (specifically the lower end of the respective first guiding face 7 or the lower end of the respective second guiding face 31) are disposed at a common height 29 (see FIG. 2). The two cylindrical guiding faces 7, 31 having the lower ends 28, 32 disposed at the common height 29 are disposed so as to be mutually offset by 180 angular degrees in the circumferential direction 18.

The plane plate 1 for contacting in each case one guide column 8, 37 has at least two cylindrical guiding faces 7, 31, wherein a first cylindrical guiding face 7 has a first lower end 28 and a first upper end 43, and a second cylindrical guiding face 31 has a second lower end 32 and a second upper end 45, wherein the first lower end 28 in relation to the axial direction 5 is disposed at a different height 29 below the second lower end 32, and wherein the first upper end 43 in relation to the axial direction 5 is disposed at a different height 29 below the second upper end 45 (see FIG. 4).

The link 34 on the upper side 39 has an upper linking face 44. The first upper end 43 and the upper linking face 44 are disposed at dissimilar heights 29 in relation to the axial direction 5, and thus are disposed so as to be mutually spaced apart in the axial direction 5 (see FIG. 4).

The upper linking face 44 along the axial direction 5, between the first upper end 43 and the second upper end 45, is disposed at a different height 29 in relation to the axial direction 5 (see FIG. 4).

The upper linking face 44 along the axial direction 5, between the first upper end 43 and the second lower end 32, is disposed at a different height 29 in relation to the axial direction 5 (see FIG. 4).

With reference to the uppermost of the plane plates 1, 33 it is illustrated in FIG. 5 that the (first) plane plate 1 at least in a first cross section 10 which between the first link 34 and the receptacle 9 (and between the second link 46 and the receptacle 9) runs parallel with the axial direction 5 and along a radial direction 11 that runs so as to be perpendicular to the axial direction 5, has at least a first region 12 having a wall thickness 13, wherein the wall thickness 13 in the first region 12, and so as to be spaced apart from the receptacle 9 as well as from the first link 34 (or from the second link 46, respectively) has a minimum 42.

The plane plate 1 is contacted by way of two lifting cylinders 4, 47 and for activating a punch 6 of the press 3 is repositionable along an axial direction 5. The plane plate 1 has a first link 34 to a first lifting cylinder 4 and a second link 46 to a second lifting cylinder 47. The links 34, 46 are disposed at a common height 29 in relation to the axial direction 5.

The minimum 42 here is configured as an opening which interconnects a first upper side 39 of the plane plate 1 that points in a first axial direction, and a lower side 41 of the plane plate 1 that points in a second axial direction 40 that is opposite to the first axial direction 38.

The wall thickness 13 is continuously variable in the first region 12, at least between the receptacle 9 and the minimum 42.

At least the first region 12 in the first cross section 10 has a first centerline 21, wherein the first centerline 21 runs at a first angle 22 in relation to the radial direction 11.

The plane plate 1 at least in a plurality of first cross sections 10 (only the first cross section 10 which sections the receptacle 9 and the links 34, 46 is shown here) which run so as to be mutually offset in a circumferential direction 18, between the receptacle 9 and a radial position 57 where the link 34, 46 is disposed (for example in a first cross section 10 which is disposed so as to be offset in the circumferential direction 18 in relation to said first cross section 10), has at least one first region 12 in which a wall thickness 13 is variable. A form line 55 of the receptacle 9 in the operation of the plane plate 1 and when transmitting a pressing force 56 is deformed by at most 0.05 mm.

The minimum 42 represents a local weakening of the plane plate 1. The minimum 42 and/or the variable wall thickness 13 serve/serves for transmitting in a targeted and controlled manner the pressing forces 56 that act in the operation of the press. Said pressing forces 56 (proceeding from the punch 6, or the punch holder, respectively) act on the plane plate 2 at least by way of the receptacle 9, on the one hand, and (proceeding from the lifting cylinders 4, 47) act at least by way of the links 34, 46 on the other hand.

By way of the at least one minimum 42 and/or the variable wall thickness 13, a force transmission of the pressing force 56, proceeding from the links 34, 46 toward the punch holder, or toward the punch 6, respectively, that is distributed uniformly across the entire receptacle 9 is guaranteed.

The receptacle 9 in the non-stressed state of the plane plate 1 (installed situation of the plane plate 1 in the press 3, or in the adapter 51 or in the adapter lower part 52 or upper part 53, respectively; no introduction of a pressing force 56) has a form line 55. Said form line 55 has a defined location or position, respectively, in relation to the axial direction 5 and in relation to the radial direction 11. The form line 55 extends in an encircling manner in the circumferential direction 18 and describes the shape of the receptacle 9. The form line here is the internal periphery of the receptacle 9.

The at least one minimum 42 and/or the variable wall thickness 13 guarantee/guarantees that a deviation from the form line 55 at the receptacle 9 remains limited when impinging the plane plate 1 with the pressing force 56.

The first plane plate 1 has an upper side 39 pointing in a first axial direction 38, and a lower side 41 pointing in a second axial direction 40 that is opposite to the first axial direction 38, wherein the at least one guiding face 7, 31 on the upper side 39 has an upper end 43; wherein the link 34 on the upper side 39 has an upper linking face 44. The upper end 43 and the upper linking face 44 are disposed at mutually dissimilar heights 29 in relation to the axial direction 5, and are thus disposed so as to be mutually spaced apart in the axial direction 5 (see FIG. 4).

FIG. 6 shows a plane plate 1 of the pressing tool 2 as per FIGS. 1 to 5 in a perspective view. FIG. 7 shows the first plane plate 1 as per FIG. 6 in a further perspective view. FIG. 8 shows the first plane plate 1 as per FIGS. 6 and 7 in a lateral view in the section VIII-VIII according to FIG. 9. FIG. 9 shows the first plane plate 1 as per FIGS. 6 to 8 in a view from above along the axial direction 5. FIGS. 6 to 9 will be collectively described hereunder. Reference is made to the explanations pertaining to FIGS. 1 to 5.

The illustrated plane plate 1 is activated by way of two lifting cylinders 4, 47, wherein the first plane plate 1 has in each case one link 34, 46 to each lifting cylinder 4, 47. The lifting cylinders 4, 47 in relation to the first plane plate 1 are disposed such that the first plane plate 1 is impinged by as low a torque as possible about an axis that is parallel with the radial direction 11.

The first plane plate 1 has four guiding faces 7, 31 which are disposed so as to be mutually spaced apart in a direction that is perpendicular to the axial direction 5. By way of the guiding faces 7, 31 first plane plate 1 can be guided along the axial direction 5 through the at least one guide column 8, 37 which extends along the axial direction 5. Twisting of the first plane plate 1 in a circumferential direction 18 and/or tilting of the plane plate 1 about an axis/direction that runs along a radial direction 11 is minimized, or prevented, respectively, by way of the at least one guide column 8, 37.

The receptacle 9 for contacting the punch 6 or a punch holder of the press 3 is centrally disposed, that is to say in a center of the first plane plate 1, when the latter is viewed along the axial direction 5 (see FIG. 9). The receptacle 9 is thus disposed between a plurality of lifting cylinders 4, 47 and a plurality of guide columns 8, 37 such that the first plane plate 1 in an impingement of the first plane plate 1 with a compression force (along the axial direction 5) is impinged by as low a torque as possible about an axis that is parallel with the radial direction 11.

The receptacle 9 here is embodied so as to be circular and has a longitudinal axis which runs so as to be parallel with the axial direction 5 and is disposed so as to be concentric with the receptacle 9. The radial direction 11 extends so as to be perpendicular to the axial direction 5, and proceeds in each case from the longitudinal axis.

The receptacle 9 has a receptacle face for contacting and supporting the punch 6, or the punch holder, respectively. The punch 6, or the punch holder, respectively, can be fastened to the receptacle 9 by way of a clamping plate, a screw fitting, a bayonet closure, or similar (see FIG. 7).

The first plane plate 1 for contacting in each case one guide column 8, 37 furthermore has at least four cylindrical guiding faces 7, 31, wherein a cylindrical first guiding face 7 has a first lower end 28, and a cylindrical second guiding face 31 has a second lower end 32, wherein the first lower end 28 and the second lower end 32 are disposed at mutually dissimilar heights 29 in relation to the axial direction 5.

The lower ends 28, 32 are disposed on a lower side 41 of the first plane plate 1. The lower ends 28, 32 of in each case two cylindrical guiding faces 7, 31 of a first plane plate 1 are disposed at a common height 29. The two cylindrical guiding faces 7, 31 having the lower ends 28, 32 disposed at the common height 29 are disposed so as to be mutually offset by 180 annular degrees in a circumferential direction 18.

The first plane plate 1 for contacting in each case one guide column 8, 37 has at least two cylindrical guiding faces 7, 31, wherein a first cylindrical guiding face 7 has a first lower end 28 and a first upper end 43, and a second cylindrical guiding face 31 has a second lower end 32 and a second upper end 45, wherein the first lower end 28 in relation to the axial direction 5 is disposed at a different height 29 below the second lower end 32, and wherein the first upper end 43 in relation to the axial direction 5 disposed at a different height 29 below the second upper end 45.

The first guiding face 7 on the upper side 39 of the plane plate 1 has a first upper end 43, wherein the first lower end 28 and the first upper end 43 are disposed at mutually dissimilar heights 29 in relation to the axial direction 5, and thus are disposed so as to be mutually spaced apart at a distance in the axial direction 5. The first lower end 28 and the second lower end 32 are disposed so as to be mutually spaced apart by approximately 250% of the distance in the axial direction 5.

The link 34 on the upper side 39 has an upper linking face 44. The first upper end 43 and the upper linking face 44 are disposed at mutually dissimilar heights 29 in relation to the axial direction 5, and thus are disposed so as to be mutually spaced apart in the axial direction 5.

The upper linking face 44 along the axial direction 5, between the first upper end 43 and the second upper end 45, is disposed at a different height 29 in relation to the axial direction 5.

The upper linking face 44 along the axial direction 5, between the first upper end 43 and the second lower end 32, is disposed at a different height 29 in relation to the axial direction 5.

As has already been explained in the context of FIG. 5, FIG. 8 here shows another first cross section 10 which in relation to the first cross section according to FIG. 5 runs so as to be offset in a circumferential direction 18. A wall thickness 13 is variable in a first region 12 between the receptacle 9 and a radial position 57 where the link 34, 46 is disposed (for example in a first cross section 10 which is disposed so as to be offset in the circumferential direction 18 in relation to said first cross section 10, see FIG. 5). A deformation of the form line 55 of the receptacle 9 in the operation of the plane plate 1 and when transmitting a pressing force 56 is limited on account of the particular design of the plane plate.

As described above, the receptacle 9 is embodied so as to be circular and has a longitudinal axis that runs so as to be parallel with the axial direction 5 and is disposed so as to be concentric with receptacle 9, wherein the links 34, 46 are disposed at identical radial positions 57 along the radial directions 11. The first regions 12 of the first cross sections 10 are thus disposed between the receptacle 9 and within a radius (radial position 57) about the longitudinal axis (see the circle embodied in dashed lines having a radius which corresponds to the radial position 57 in FIG. 9).

FIG. 10 shows a known pressing tool 2 in a lateral sectional view. The pressing tool 2 is an adapter lower part 53 of an adapter 51 of a press 3 (see FIGS. 11 and 12). The pressing tool 2 comprises four plane plates 1 which are disposed on top of one another along the axial direction 5. Each of the four lane plates 1 is repositioned along the axial direction 5 by two lifting cylinders 4. Each plane plate 1 thus has two links 34. Furthermore, four guide columns 8 are provided, wherein each plane plate 1 for contacting the guide columns 8 that are common to the plane plate 1 has in each case four cylindrical guiding faces 7 on the guide column 8. Furthermore, each plane plate 1 has in each case one centrally disposed receptacle 9 for contacting the punch 6 (cf. FIG. 8) or a punch holder (here likewise symbolized by the punch 6) of the press 3. The plane plates 1 are disposed on top of one another along an axial direction 5 such that the guiding faces 7 of each plane plate 1 are in each case disposed so as to be coaxial with the corresponding guiding faces 7 of the other plane plates 1.

The pressing tool 2 here furthermore comprises a base plate 49 and a die receptacle plate 50, the guide columns 8 extending therebetween and the plane plates 1 being disposed therebetween.

In the case of the known pressing tool 2, the individual plane plates 1 are disposed so as to be on top of one another and mutually spaced apart in the axial direction 5, that is to say that said plane plates 1 are permanently disposed at dissimilar heights 29 (levels) along the axial direction 5. The plane plate 1 between the centrally disposed receptacle 9 for the punch holder or the punch 6 extends along the radial direction 1 at least up to a cylindrical guiding face 7 which is provided for contacting one of the guide columns 8.

The plane plates 1 in the cross section illustrated are shaped so as to be rectangular and have a consistent wall thickness 13. The receptacle 9 here is embodied so as to be cylindrical and proceeding from the plane plate 1 extends along the axial direction 5. The receptacles 9 of the lower plane plates 1 herein are in each case embodied so as to be longer than the receptacle 1 of the plane plate 1 that is disposed in a neighboring manner. The cross-sectional variation does not lie in the region between the guiding faces 7 on the guide columns 8 and the central receptacle 9, and also does not run continuously along an extent, but is provided in each case only at a specific position, specifically at the receptacle 9. The cross-sectional variation is in each case formed by lateral walls that run so as to be parallel with the axial direction 5.

FIG. 11 shows a known adapter 51 for a press 3 in a lateral sectional view. The adapter 51 comprises an adapter upper part 52 as well as an adapter lower part 53 (similar to the adapter lower part 53 as per FIG. 10) having plane plates 1, a base plate 49, and a die receptacle plate 50. Reference is made to the explanations pertaining to FIG. 10.

FIG. 12 shows a known press frame 54 for receiving an adapter 51, for example the adapter 51 as per FIG. 11. The adapter 51 is supported on the press frame 54.

The press frame 54 and the adapter 51 having the components mentioned above form a press 3. The press frame 54 has two couplings 58 for receiving the adapter 51.

The construction of the known press 3, or of the pressing tool 2, respectively, (thus at least of the adapter lower part 53) according to FIGS. 10 to 12 has a large installation height 48 in the axial direction 5. Proceeding from the die receptacle plate 50 for each tool plane, which also comprises the respective plane plate 1, the individual components of the respective tool plane (thus the punch 6, optionally the associated punch holder, the receptacle 9) extend dissimilarly far along the axial direction 5 such that dissimilar elasticities are present for each tool plane. As a result of the dissimilar elasticities, demolding of the green compact to be produced can be specifically problematic on account of the dissimilar expansion of the components between different tool planes in the relaxation of the tool planes (compression force is reduced), wherein formations of cracks can arise in the green compact.

FIG. 13 shows a further exemplary embodiment of the pressing tool 2 of a press 3 in a perspective, partially sectional, view. FIG. 14 shows the pressing tool 2 as per FIG. 13 in a view from above along the axial direction 5. The profiles of the section lines XV-XV and XVI-XVI are illustrated in FIG. 14. FIG. 15 shows a lateral view of the pressing tool 2 as per FIGS. 13 and 14 in the section XV-XV according to FIG. 14. FIG. 16 shows the pressing tool 2 as per FIGS. 13 to 15 in a lateral view in a further section XVI-XVI according to FIG. 14. FIGS. 13 to 16 will be collectively described hereunder. Reference is made to the explanations pertaining to FIGS. 1 to 5.

By contrast to the pressing tool 2, or the press 3, respectively, as per FIGS. 1 to 5, the pressing tool 2 here has eight (8) guide columns 8, 37, specifically four (4) first guide columns 8 and four (4) second guide columns 37.

The guide columns 8, 37 extend in each case from the base plate 49 up to the die receptacle plate 50.

Each plane plate 1, 33 furthermore has in each case two (2) lifting cylinders 4, 47. Each lifting cylinder 4, 47 along the axial direction 5 extends through the base plate 49 up to a link 34, 46 on the plane plate 1, 33. It can be seen that the links 34, 46 of the lifting cylinders 4, 47 on a plane plate are in each case disposed at an identical height 29.

The plane plates 1, 33 of the pressing tool 2 for contacting eight guide columns 8, 37 that are common to the plane plates 1, 33 have in each case eight cylindrical guiding faces 7, 31, 35. A first plane plate 1 has a first guiding face 7 having a first lower end 28, and the second plane plate 33 has a third guiding face 35 having a third lower end 36. The first plane plate 1 in relation to the axial direction 5 is capable of being disposed above the second plane plate 33, and the plane plates 1, 33 herein are capable of being mutually disposed such that the first guiding face 7 contacts a first guide column 8 of the common guide columns 8, 37, and the third guiding face 35 contacts a second (thus another) guide column 37 of the common guide columns 8, 37. The first lower end 28 in relation to the axial direction 5 herein is disposed below the third lower end 36 (see FIGS. 15 and 16).

FIG. 17 shows a plane plate 1 of the pressing tool 2 as per FIGS. 13 to 16 in a perspective view. FIG. 18 shows the plane plate 1 as per FIG. 17 in a view from above along the axial direction 5. FIG. 19 shows the plane plate 1 as per FIGS. 17 and 18 in a lateral view. FIG. 20 shows the plane plate 1 as per FIGS. 17 to 19 in a lateral view in the section XX-XX according to FIG. 18. FIG. 21 shows the plane plate 1 as per FIGS. 17 to 20 in a lateral view in the section XXI-XXI according to FIG. 18. FIGS. 17 to 21 will be collectively described hereunder. Reference is made to the explanations pertaining to FIGS. 13 to 16 as well as to 6 to 9.

The illustrated plane plate 1 is actuated by way of two lifting cylinders 4, 47, wherein the first plane plate 1 has in each case one link 34, 46 to each lifting cylinder 4, 47.

The plane plate 1 furthermore has eight cylindrical guiding faces 7, 31, wherein each guiding face 7, 31 contacts each case one guide column 8, 37, wherein a cylindrical first guiding face 7 has a first lower end 28, and a cylindrical second guiding face 31 has a second lower end 32 (see FIG. 21), wherein the first lower end 28 and the second lower end 32 are disposed at dissimilar heights 29 in relation to the axial direction 5.

The lower ends 28, 32 are disposed on a lower side 41 of the plane plate 1. All four (4) first lower ends 28 of the first guiding face 7 here are in each case disposed at a common height. Furthermore, all four (4) second lower ends 32 of the second guiding faces are in each case disposed at a common height. The first cylindrical guiding faces 7 having the first lower ends 28 disposed at the common height 29 are disposed so as to be mutually offset by 90 angular degrees in the circumferential direction 18 (likewise the second guiding faces 31 which herein in relation to the first guiding faces 7 are offset by 45 angular degrees in a circumferential direction 18).

The first plane plate 1 has eight cylindrical guiding faces 7, 31, wherein first guiding faces 7 contact first guide columns 8, and second guiding faces 31 contact second guide columns 37. First cylindrical guiding faces 7 have in each case one first lower end 28 and one first upper end 43, wherein second cylindrical guiding faces 31 have in each case one second lower end 32 and one second upper end 45. The first lower end 28 in relation to the axial direction 5 is disposed at a different height 29 below the second lower end 32. The first upper end 43 in relation to the axial direction 5 is disposed at a different height 29 below the second upper end 45.

The first link 34 and the second link 46 on the upper side 39 have an upper linking face 44. The first upper end 43 and the upper linking face 44 are disposed at dissimilar heights 29 in relation to the axial direction 5, and thus are disposed so as to be mutually spaced apart in the axial direction 5.

The upper linking face 44 along the axial direction 5, between the first upper end 43 and the second upper end 45, is disposed at a different height 29 in relation to the axial direction 5.

The upper linking face 44 along the axial direction 5, between the first upper end 43 and the second lower end 32, is disposed at a different height 29 in relation to the axial direction 5.

The plane plate 1 at least in a first cross section 10 (illustrated in FIG. 20, for example) which between the receptacle 9 and the first guiding face 7 runs parallel with the axial direction 5 and along the radial direction 11 that runs so as to be perpendicular to the axial direction 5 has at least a first region 12 in which the wall thickness 13 of the plane plate 1 is continuously variable. The wall thickness 13 herein is determined in a direction that is parallel with the axial direction 5.

Said wall thickness 13 is continuously variable, that is to say that the first region 12 at each mutually neighboring position along the radial direction 11 has in each case another wall thickness 13.

The first region 12 in the first cross section 10 has a first centerline 21, wherein the first centerline 21 runs at a first angle 22 in relation to the radial direction 11. The first centerline 21 is formed by the centers of the wall thickness 13 that is present at the respective radial position.

LIST OF REFERENCE SIGNS

1 First plane plate
2 Pressing tool
3 Press
4 (First) lifting cylinder
5 Axial direction
6 Punch
7 (First) guiding face
8 Guide column
9 Receptacle
10 First cross section
11 Radial direction
12 First region
13 Wall thickness
14 First extent
15 Spacing
16 Second cross section
17 Angular range
18 Circumferential direction
19 Second region
20 Second extent
21 First centerline
22 First angle
23 Second centerline
24 Second angle
25 Third region
26 Third centerline
27 Third angle
28 (First) lower end
29 Height
30 Reversing region
31 Second guiding face
32 Second lower end
33 Second plane plate
34 (First) link
35 Third guiding face
36 Third lower end
37 Second guide column
38 First axial direction
39 Upper side
40 Second axial direction
41 Lower side
42 Minimum 43 (First) upper end
44 Upper linking face
45 Second upper end
46 Second link
47 Second lifting cylinder
48 Installation height
49 Base plate
50 Die receptacle plate
51 Adapter
52 Adapter upper part
53 Adapter lower part
54 Press frame
55 Form line
56 Pressing force
57 Position
58 Coupling

The invention claimed is:

1. A plane plate for a pressing tool of a press, wherein the plane plate for activating a punch of the press by way of at least one lifting cylinder is displaceable along an axial direction, the plane plate comprising:
a link to the at least one lifting cylinder;
at least one guiding face that is at least partially cylindrical and that is parallel with the axial direction for contacting a guide column; and
a centrally disposed receptacle for contacting the punch or the punch holder of the press;
wherein the plane plate at least in a first cross section which, so as to be parallel with the axial direction and along a radial direction that runs so as to be perpendicular to the axial direction runs through the link and the receptacle, between the link and the receptacle has at least a first region having a wall thickness, wherein the wall thickness in the first region and so as to be spaced apart from the receptacle as well as from the link has at least a minimum.

2. The plane plate as claimed in claim 1, wherein the minimum is configured as an opening which connects to one another an upper side of the plane plate that points in a first axial direction and a lower side of the plane plate that points in a second axial direction counter to the first axial direction.

3. The plane plate as claimed in claim 1, wherein the wall thickness in the first region, at least between the receptacle and the minimum, is continuously variable.

4. The plane plate for a pressing tool of a press, wherein the plane plate for activating a punch of the press by way of at least one lifting cylinder is displaceable along an axial direction, the plane plate comprising:
a link to the at least one lifting cylinder;
at least one guiding face that is at least partially cylindrical and that is parallel with the axial direction for contacting a guide column; and
a centrally disposed receptacle for contacting the punch or the punch holder of the press;
wherein the plane plate in at least a plurality of first cross sections which, so as to be parallel with the axial direction and along a radial direction that runs so as to be perpendicular to the axial direction and in a circumferential direction run so as to be mutually offset, between the receptacle and a radial position where the link is disposed, has at least a first region in which a wall thickness is variable; and
wherein a form line of the receptacle in the operation of the plane plate and when transmitting a pressing force is deformed by at most 0.05 millimeters.

5. The plane plate as claimed in claim 4, wherein at least the first region in the first cross section has a first centerline, wherein the first centerline in relation to the radial direction runs at a first angle of at least 10 angular degrees.

6. The plane plate as claimed in claim 4, wherein the plane plate has an upper side that points in a first axial direction, and a lower side that points in a second axial direction, counter to the first axial direction; wherein the at least one guiding face on the upper side has an upper end; wherein the link on the upper side has an upper linking face; wherein the upper end and the upper linking face are disposed at dissimilar heights in relation to the axial direction and thus are disposed so as to be mutually spaced apart in the axial direction.

7. The plane plate as claimed in claim 6, wherein the plane plate for contacting in each case one guide column has at least two guiding faces that are at least partially cylindrical including a first guiding face and a second guiding face, wherein the first guiding face has a first lower end and a first upper end, and the second guiding face has a second lower end and a second upper end, wherein the first lower end in relation to the axial direction is disposed at a different height below the second lower end, and wherein the first upper end in relation to the axial direction is disposed at a different height below the second upper end.

8. The plane plate as claimed in claim 7, wherein the upper linking face along the axial direction, between the first upper end and the second upper end, is disposed at a different height in relation to the axial direction.

9. The plane plate as claimed in claim 8, wherein the upper linking face along the axial direction, between the first upper end and the second lower end, is disposed at a different height in relation to the axial direction.

10. The plane plate as claimed in claim 4, wherein the plane plate for activating the punch of the press by way of at least two lifting cylinders is displaceable along an axial direction; wherein the plane plate has a first link to a first lifting cylinder and a second link to a second lifting cylinder; wherein the links are disposed at a common height in relation to the axial direction.

11. The plane plate as claimed in claim 4, wherein the plane plate for activating the punch of the press by way of at least two lifting cylinders is displaceable along an axial direction; wherein the link includes a first link and a second link; wherein the plane plate has the first link to a first lifting cylinder and the second link to a second lifting cylinder; wherein the first link and the second link are disposed at dissimilar heights in relation to the axial direction.

12. A pressing tool for a press, the pressing tool comprising a first plane plate and a second plane plate, wherein at least the first plane plate for activating a punch of the press by way of at least one lifting cylinder is displaceable along an axial direction; wherein at least the first plane plate has a link to the at least one lifting cylinder, wherein each plane plate for contacting a guide column that is common to the plane plates has in each case at least one guiding face that is at least partially cylindrical, and for contacting the punch or a punch holder of the press has in each case one centrally disposed receptacle; wherein the plane plates along an axial direction are capable of being disposed on top of one another such that the respectively at least one guiding face of each plane plate is disposed so as to be coaxial with the respectively other at least one guiding face; wherein at least the first plane plate is a plane plate as claimed in claim 4; wherein the plane plates are disposable so as to be at least partially mutually overlapping along the axial direction and along the radial direction.

13. A pressing tool as claimed in claim 12, wherein the plane plates for contacting two guide columns that are common to the plane plates have in each case at least two guiding faces that are at least partially cylindrical including a first guiding face and a third guiding face; wherein the first plane plate has the first guiding face having a first lower end, and the second plane plate has the third guiding face having a third lower end, wherein the first plane plate in relation to the axial direction is disposable above the second plane plate, and the plane plates herein are mutually disposable such that the first guiding face contacts a first guide column of the common guide columns, and the third guiding face contacts a second guide column of the common guide columns; wherein the first lower end in relation to the axial direction herein is disposed below the third lower end.

14. A method of producing a green compact using the plane plate of claim 1 in a pressing tool, the method comprising:
   compressing a powder in the pressing tool to produce the green compact.

15. A method of producing a green compact using the plane plate of claim 4 in a pressing tool, the method comprising:
   compressing a powder in the pressing tool to produce the green compact.

* * * * *